US011912251B2

(12) United States Patent
Jung

(10) Patent No.: US 11,912,251 B2
(45) Date of Patent: Feb. 27, 2024

(54) ELECTRIC BRAKE SYSTEM

(71) Applicant: HL MANDO CORPORATION, Pyeongtaek-si (KR)

(72) Inventor: Heechul Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 259 days.

(21) Appl. No.: 17/357,985

(22) Filed: Jun. 25, 2021

(65) Prior Publication Data

US 2021/0402969 A1    Dec. 30, 2021

(30) Foreign Application Priority Data

Jun. 25, 2020   (KR) .................. 10-2020-0077649
Jun. 24, 2021   (KR) .................. 10-2021-0082153

(51) Int. Cl.
*B60T 8/40*        (2006.01)
*B60T 13/68*       (2006.01)
(Continued)

(52) U.S. Cl.
CPC ............ *B60T 13/686* (2013.01); *B60T 7/042* (2013.01); *B60T 7/06* (2013.01); *B60T 8/4081* (2013.01);
(Continued)

(58) Field of Classification Search
CPC ...... B60T 13/686; B60T 13/74; B60T 13/745; B60T 2270/404; B60T 2270/413;
(Continued)

(56) References Cited

U.S. PATENT DOCUMENTS

| 10,752,228 B2* | 8/2020 | Peichl .................... B60T 8/4081 |
| 11,383,688 B2* | 7/2022 | Dolmaya .............. B60T 8/4081 |
| 2013/0333376 A1* | 12/2013 | Murayama ............ B60T 8/1755 |
| | | 60/545 |

(Continued)

FOREIGN PATENT DOCUMENTS

| EP | 2 520 473 | 2/2011 |
| JP | 2007-15547 | 1/2007 |

(Continued)

OTHER PUBLICATIONS

Office Action dated Jun. 14, 2022 for Korean Patent Application No. 10-2021-0082153 and its English translation from Global Dossier.

*Primary Examiner* — Bradley T King
(74) *Attorney, Agent, or Firm* — Ladas & Parry, LLP

(57) ABSTRACT

Disclosed herein an electronic brake system includes a first block comprising a master cylinder having a first master piston connected to a brake pedal and a first master chamber whose volume is changed by a displacement of the first master piston; a second block comprising a pedal simulator, a hydraulic pressure supply device that generates a hydraulic pressure by operating a hydraulic piston according to an electrical signal, and a hydraulic control unit comprising a first hydraulic circuit that controls a hydraulic pressure transferred to two wheel cylinders and a second hydraulic circuit that controls a hydraulic pressure transferred to the other two wheel cylinders, the second block disposed to be spaced apart from the first block; a plurality of electronic control units (ECUs) that controls various devices and valves based on hydraulic pressure information and displacement information of the brake pedal; and a connection line having one end connected to the first block and the other end connected to the second block; wherein the connection line has one end connected to the first master chamber and the other end thereof connected to the pedal simulator side.

17 Claims, 5 Drawing Sheets

(51) Int. Cl.
*B60T 7/04* (2006.01)
*B60T 13/16* (2006.01)
*B60T 17/06* (2006.01)
*B60T 17/04* (2006.01)
*G05G 1/40* (2008.04)
*B60T 8/88* (2006.01)
*B60T 7/06* (2006.01)

(52) U.S. Cl.
CPC ............ *B60T 8/885* (2013.01); *B60T 13/161* (2013.01); *B60T 17/04* (2013.01); *B60T 17/06* (2013.01); *G05G 1/40* (2013.01); *B60T 2270/402* (2013.01); *B60T 2270/403* (2013.01); *B60T 2270/404* (2013.01); *B60T 2270/82* (2013.01)

(58) Field of Classification Search
CPC ........ B60T 2270/82; B60T 7/042; B60T 7/06; B60T 8/4081; B60T 8/885; B60T 13/161; B60T 17/04; B60T 17/06; B60T 2270/402; B60T 2270/403; G05G 1/40
See application file for complete search history.

(56) References Cited

U.S. PATENT DOCUMENTS

| | | | | |
|---|---|---|---|---|
| 2016/0082937 | A1* | 3/2016 | Nakaoka | B60T 8/321 303/15 |
| 2017/0282877 | A1* | 10/2017 | Besier | B60T 8/885 |
| 2019/0031165 | A1* | 1/2019 | Besier | B60T 8/92 |
| 2019/0071059 | A1* | 3/2019 | Besier | B60T 8/4081 |
| 2019/0176785 | A1* | 6/2019 | Hansmann | B60T 13/686 |
| 2019/0241167 | A1* | 8/2019 | Peichl | B60T 13/161 |
| 2019/0367000 | A1* | 12/2019 | Lee | B60T 13/745 |
| 2020/0139949 | A1* | 5/2020 | Dolmaya | B60T 8/4081 |
| 2020/0189546 | A1* | 6/2020 | Dolmaya | B60T 13/18 |
| 2021/0009096 | A1* | 1/2021 | Mahnkopf | B60T 13/662 |
| 2021/0053540 | A1* | 2/2021 | Besier | B60T 8/326 |
| 2022/0153249 | A1* | 5/2022 | Matoy | B60T 13/686 |

FOREIGN PATENT DOCUMENTS

| | | |
|---|---|---|
| JP | 2011-51494 | 3/2011 |
| KR | 10-2002-0064649 | 8/2002 |
| KR | 10-2017-0031396 | 3/2017 |
| KR | 10-2019-0035256 | 4/2019 |
| KR | 10-2019-0136210 | 12/2019 |

* cited by examiner

[FIG. 1]
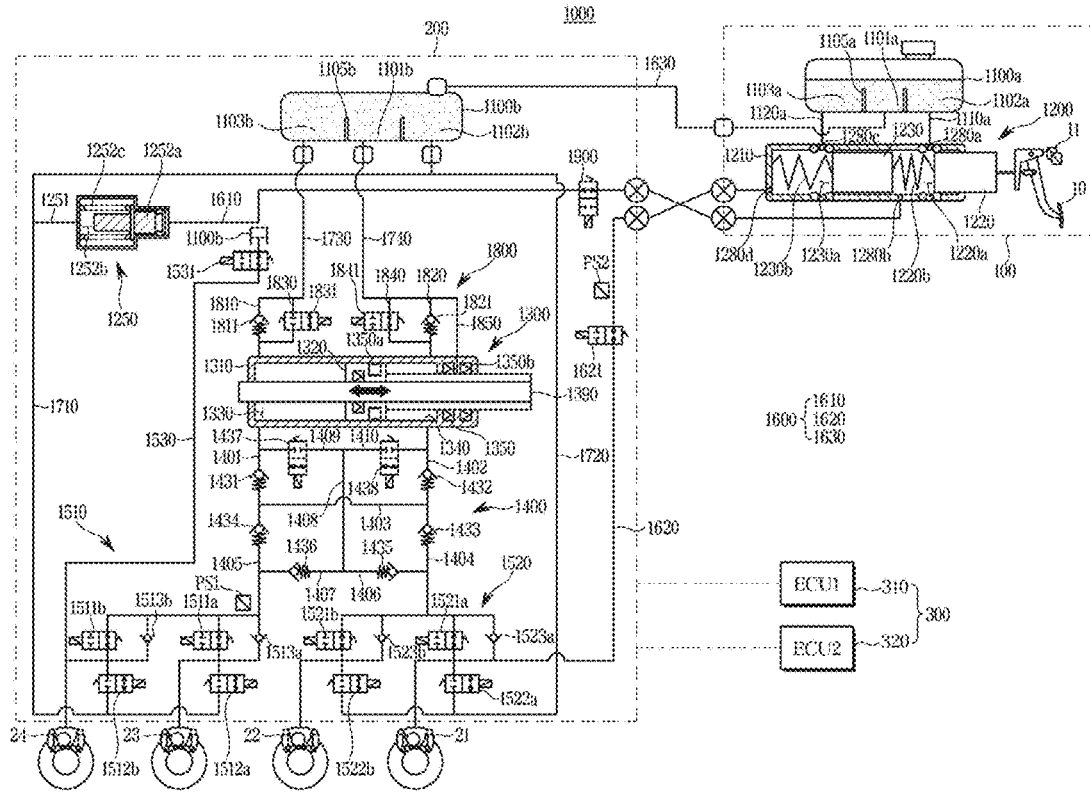
[FIG. 2]
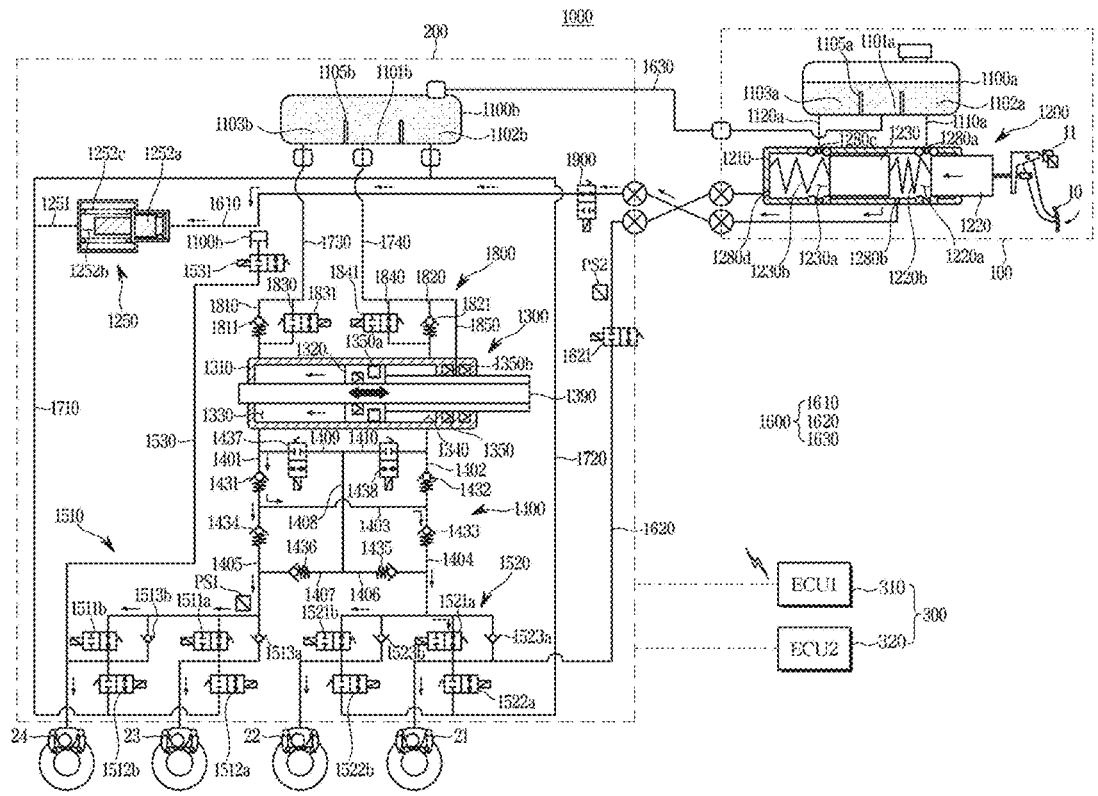

[FIG. 3]
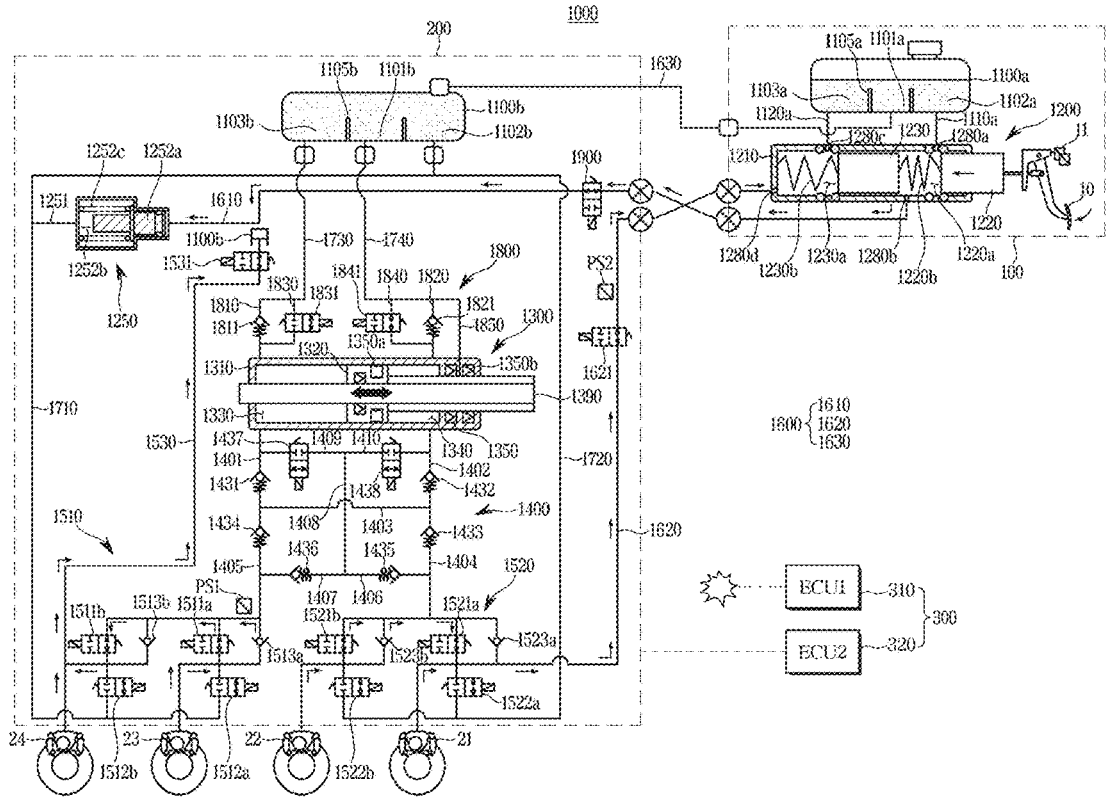
[FIG. 4]
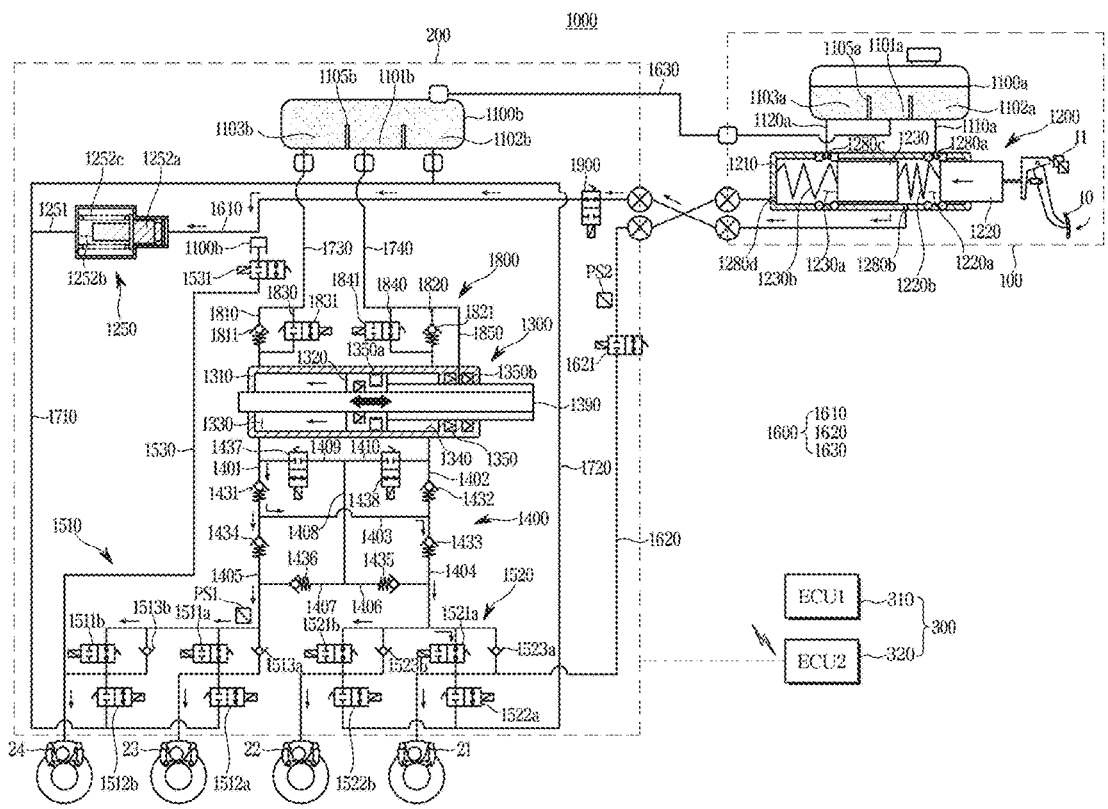

[FIG. 5]
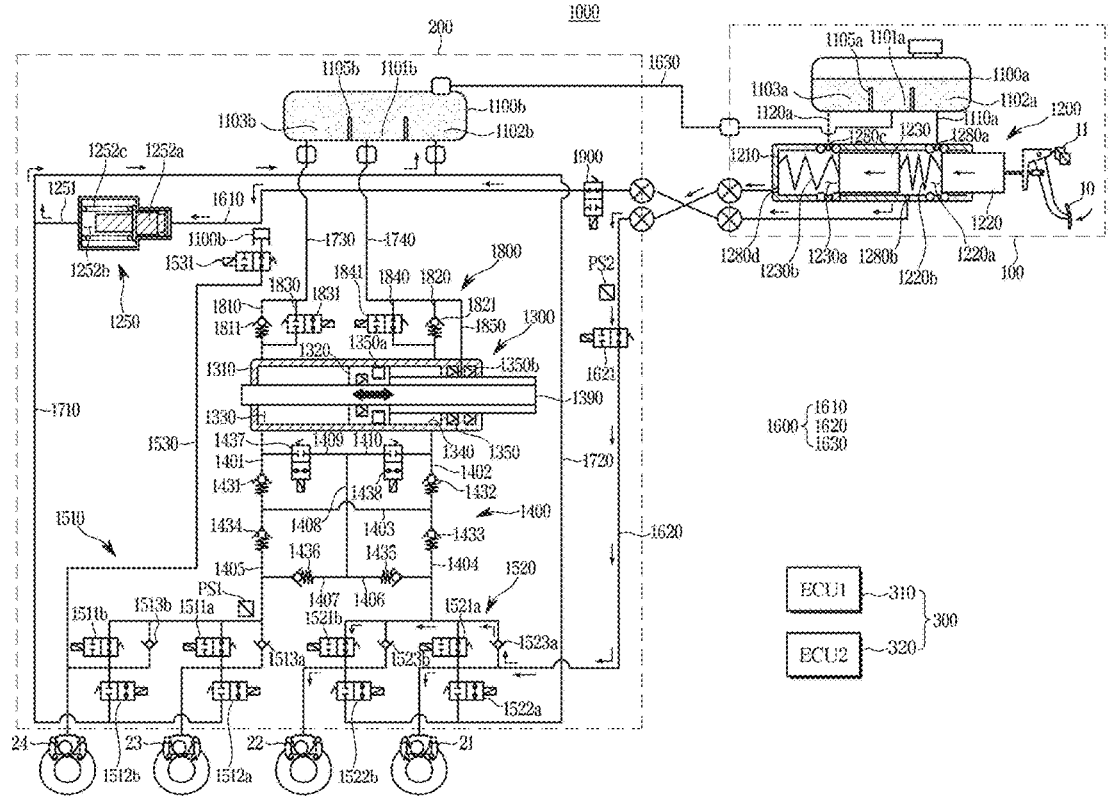
[FIG. 6]
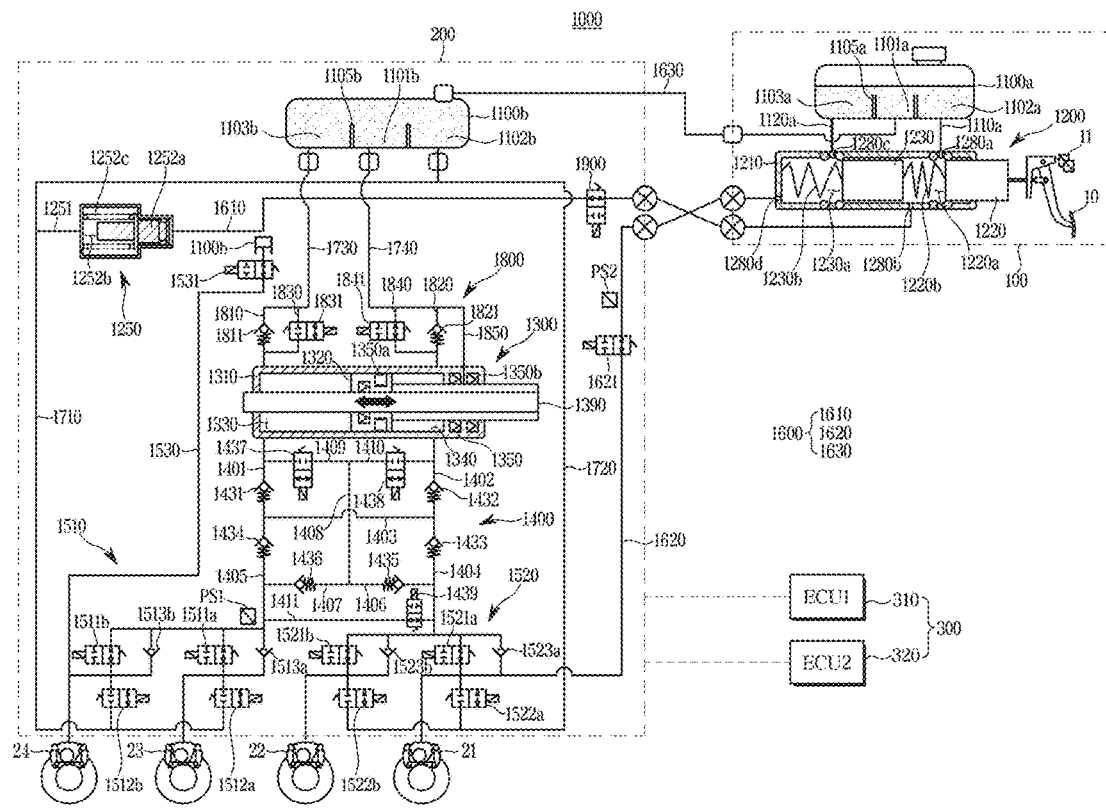

[FIG. 7]
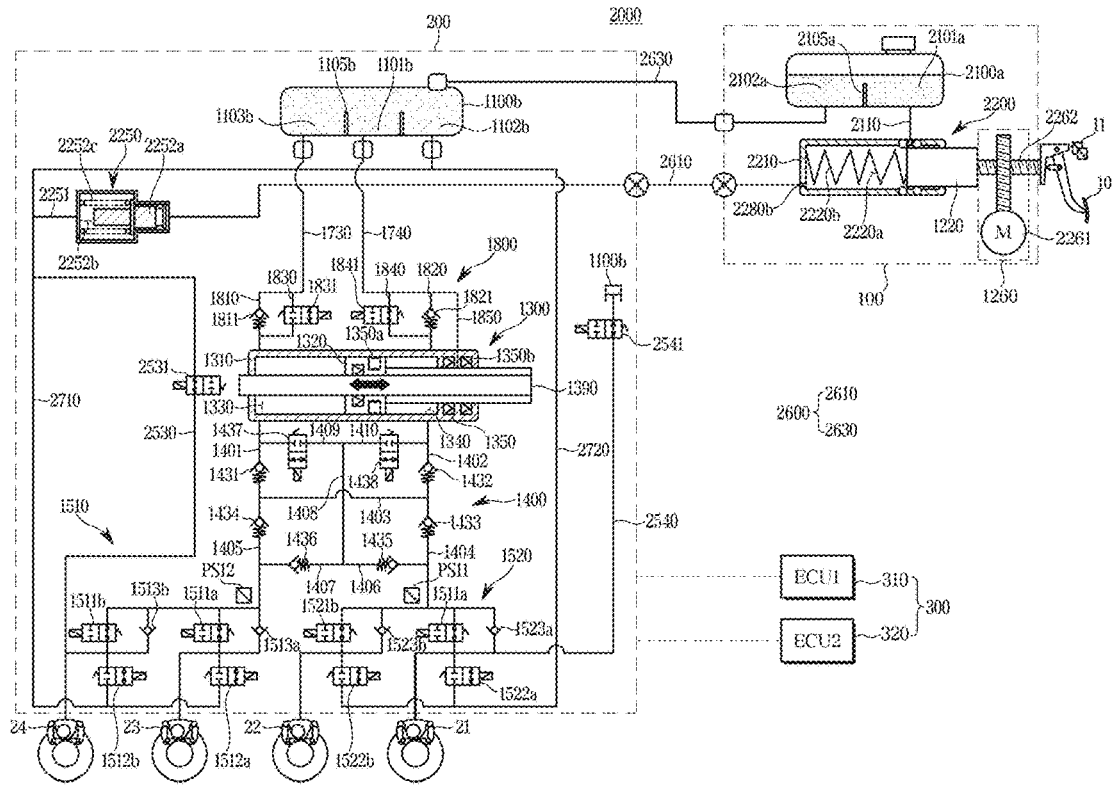
[FIG. 8]
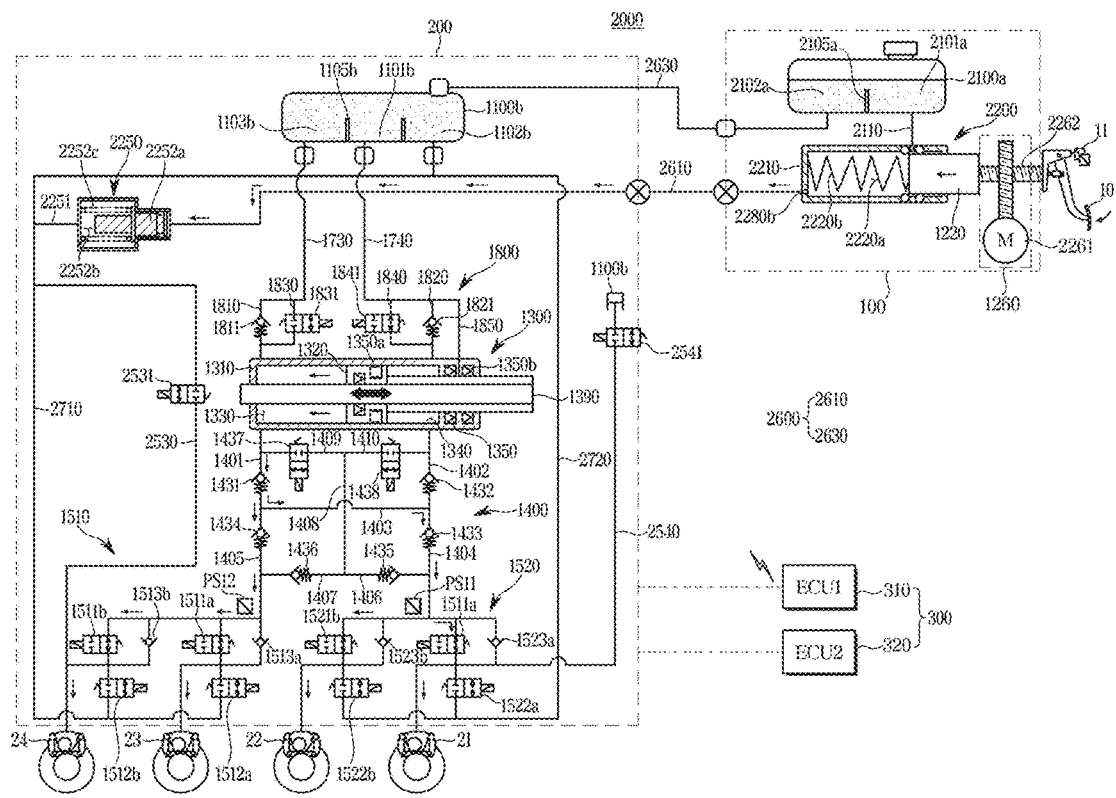

[FIG. 9]
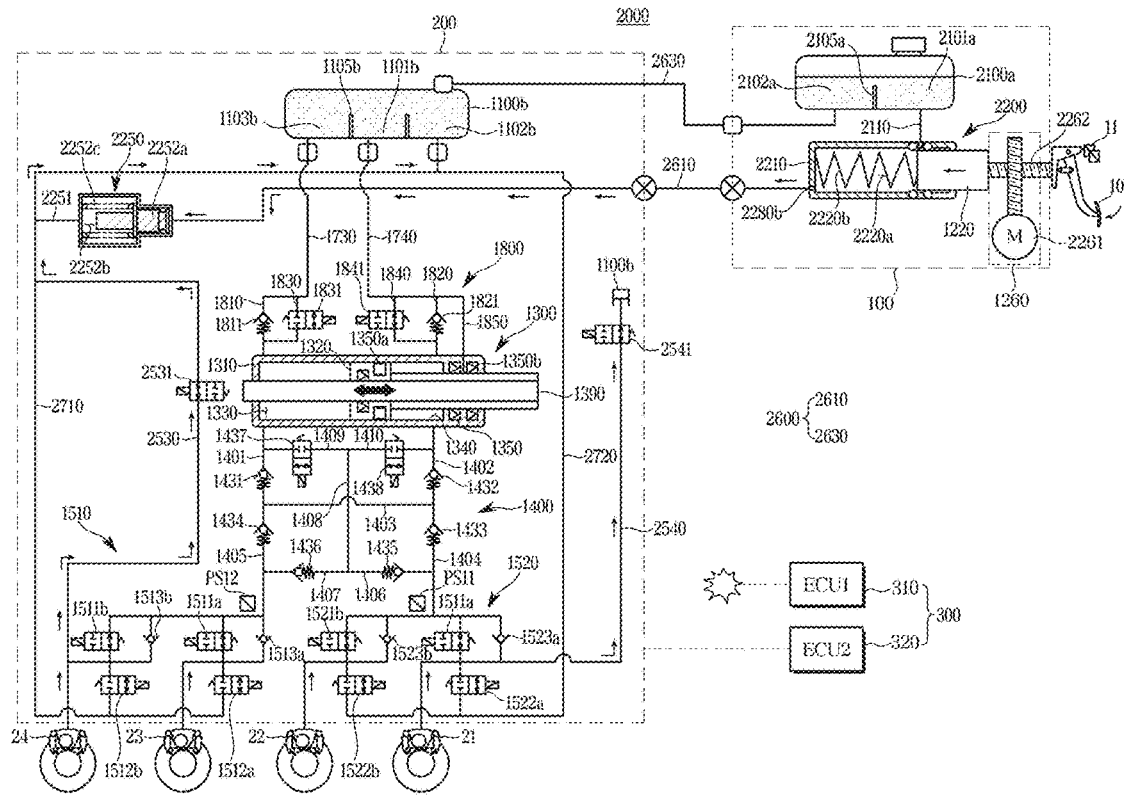
[FIG. 10]
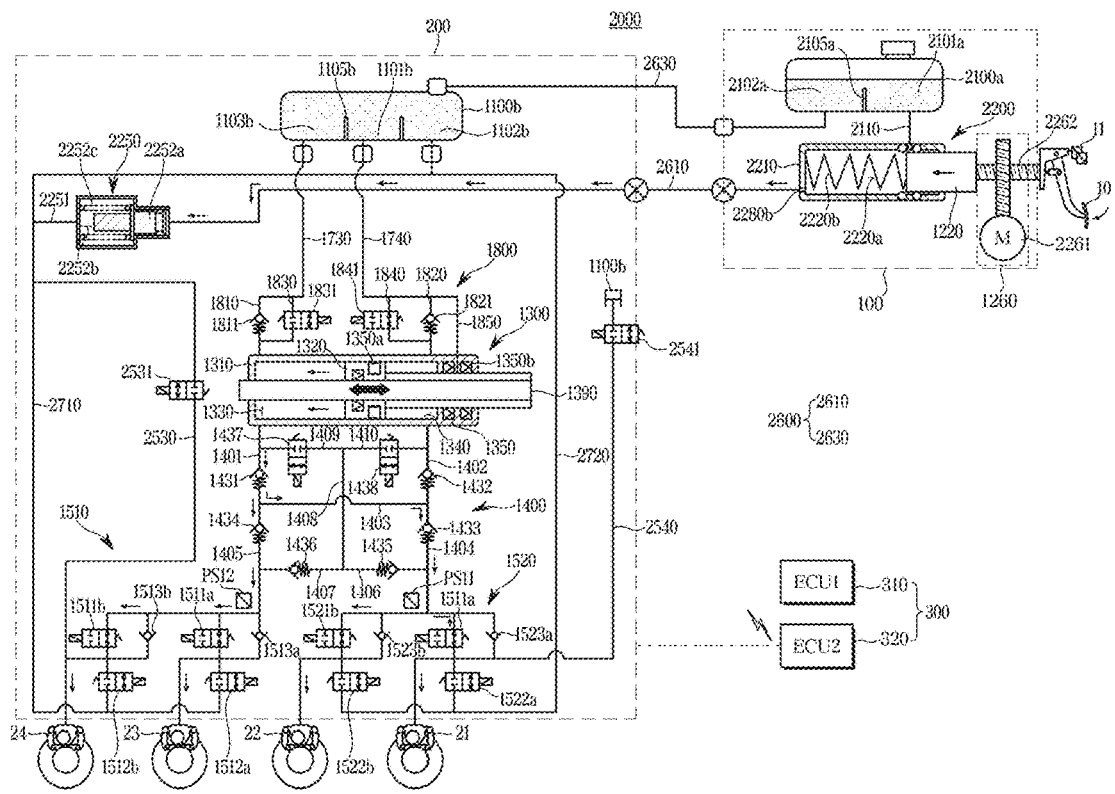

ELECTRIC BRAKE SYSTEM

CROSS-REFERENCE TO RELATED APPLICATION(S)

This application is based on and claims priority under 35 U.S.C. § 119 to Korean Patent Applications No. 10-2020-0077649, filed on Jun. 25, 2020 and No. 10-2021-0082153, filed on Jun. 24, 2021 in the Korean Intellectual Property Office, the disclosure of which is incorporated herein by reference in its entirety.

BACKGROUND

1. Technical Field

The disclosure relates to an electronic brake system, and more particularly, to an electronic brake system for improving a pedal feel and reducing occurrence of a kickback.

2. Description of the Related Art

Vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system and an operation method thereof, which include a hydraulic pressure supply device that receives an electrical signal corresponding to a pressing force of a driver from a pedal displacement sensor that detects a displacement of a brake pedal when the driver depresses the brake pedal and supplies a hydraulic pressure required for braking to wheel cylinders, have been widely used.

In such an electronic brake system and an operation method thereof, an electrical signal is generated and provided when a driver depresses the brake pedal or the vehicle travels an autonomous driving, in a normal operation mode, and based on this, the hydraulic pressure supply device is electrically operated and controlled to generate a hydraulic pressure required for braking and transfer the hydraulic pressure to the wheel cylinders. Although such an electronic brake system and operation method are electrically operated and controlled so that complex and various braking operations may be implemented, when a technical problem occurs in an electric component, a hydraulic pressure required for braking may not be stably generated, and thus the safety of passengers may not be secured.

In an electronic brake system, since most of the components thereof are controlled by electrical signals of an electronic control unit (ECU), a failure of the ECU may cause a great problem. Accordingly, the electronic brake system may include a plurality of the ECUs in case the ECU fails, and even if one ECU operates abnormally, other ECUs that recognizes this is connected to operate to ensure the safety of passengers.

On the other hand, a failure occurs in one ECU operating in a normal mode and the moment before other ECUs that recognizes it operates, an electronic brake system operates in an abnormal operation mode in which there is no electrical signal temporarily, and may cause discomfort, such as a kickback, to the driver's pedal feeling when switching modes.

SUMMARY

The disclosure provides an electronic brake system capable of effectively implement a braking in various operating situations.

Further, the disclosure provides an electronic brake system having improved performance and operational reliability.

Further, the disclosure provides an electronic brake system capable of improving a degree of design freedom of the vehicle.

Further, the disclosure provides an electronic brake system easily and efficiently installing and disposing the vehicle.

Further, the disclosure provides an electronic brake system capable of stably providing a braking pressure even when a component fails.

Further, the disclosure provides an electronic brake system capable of improving safety through a redundancy function of a plurality of ECUs.

Further, the disclosure provides an electronic brake system capable of reducing a kickback and maintaining a pedal feel to reduce a sense of heterogeneity in a driver's pedal feeling.

Additional aspects of the disclosure will be set forth in part in the description which follows and, in part, will be obvious from the description, or may be learned by practice of the disclosure.

In accordance with an aspect of the disclosure, an electronic brake system includes a first block comprising a master cylinder having a first master piston connected to a brake pedal and a first master chamber whose volume is changed by a displacement of the first master piston; a second block comprising a pedal simulator, a hydraulic pressure supply device that generates a hydraulic pressure by operating a hydraulic piston according to an electrical signal, and a hydraulic control unit comprising a first hydraulic circuit that controls a hydraulic pressure transferred to two wheel cylinders and a second hydraulic circuit that controls a hydraulic pressure transferred to the other two wheel cylinders, the second block disposed to be spaced apart from the first block; a plurality of electronic control units (ECUs) configured to control various devices and valves based on hydraulic pressure information and displacement information of the brake pedal; and a connection line having one end connected to the first block and the other end connected to the second block; wherein the connection line has one end connected to the first master chamber and the other end thereof connected to the pedal simulator side.

The master cylinder further include a second master piston provided to be displaceable by a hydraulic pressure of the first master chamber, and a second master chamber whose volume is changed by a displacement of the second master piston, and the connection line may further include a second connection line having one end connected to the second master chamber and the other end thereof connected to the second hydraulic circuit side.

The first block may further include a main reservoir in which a pressurized medium is stored, the second block may further include a sub-reservoir in which the pressurized medium is stored, and the connection line may further include a third connection line having one end connected to the main reservoir and the other end thereof connected to the sub-reservoir.

The second block may further include an outlet flow path connecting the first hydraulic circuit and the sub-reservoir; a first cut valve provided in the outlet flow path to control a flow of the pressurized medium; and a second cut valve provided on the second connection line to control a flow of the pressurized medium.

The second block may further include a first sub-reservoir flow path connecting the sub-reservoir and a rear end of the first hydraulic circuit; and a second sub-reservoir flow path connecting the sub-reservoir and a rear end of the second hydraulic circuit.

The second block may further include a simulator discharge passage connected to a rear end of the pedal simulator, and the simulator discharge passage joins the first sub-reservoir flow path and is connected to the sub-reservoir.

The hydraulic control unit may further include a balance passage connecting the first hydraulic circuit and the second hydraulic circuit, and a balance valve provided in the balance passage to control a flow of the pressurized medium.

The first block may further include a pedal folding device provided between the first master piston and the brake pedal.

The first block may further include a main reservoir in which a pressurized medium is stored, the second block may further include a sub-reservoir in which the pressurized medium is stored, and the connection line may further include a second connection line having one end connected to the main reservoir and the other end thereof connected to the sub-reservoir.

The second block may further include a first sub-reservoir flow path connecting the sub-reservoir and a rear end of the first hydraulic circuit; and a second sub-reservoir flow path connecting the sub-reservoir and a rear end of the second hydraulic circuit.

The second block may further include a first outlet flow path connecting the first hydraulic circuit and the first sub-reservoir flow path; a second outlet flow path connecting the second hydraulic circuit and the sub-reservoir; a first cut valve provided in the first outlet flow path to control a flow of the pressurized medium; and a second cut valve provided in the second outlet flow path to control a flow of the pressurized medium.

The second block may further include a simulator discharge passage connected to a rear end of the pedal simulator, and the simulator discharge passage joins the first sub-reservoir flow path and is connected to the sub-reservoir.

The pedal folding device may include an actuator that generates and provides a power; and a gear unit provided between the actuator and an input rod connected to the brake pedal and is configured to convert a rotational force of the actuator into a linear motion of the input rod.

The hydraulic pressure supply device may include a first pressure chamber provided in front of the hydraulic piston and a second pressure chamber provided in a rear of the hydraulic piston.

The second block may further include a dump control unit provided between the sub-reservoir and the hydraulic pressure supply device to control a flow of the pressurized medium, and the dump control unit may include a first dump control unit that controls a flow of the pressurized medium between the first pressure chamber and the sub-reservoir, and a second dump control unit that controls a flow of the pressurized medium between the second pressure chamber and the sub-reservoir.

The second block may further include a third sub-reservoir flow path connecting the sub-reservoir and the first dump control unit, and a fourth sub-reservoir flow path connecting the sub-reservoir and the second dump control unit.

The plurality of ECUs may include a first ECU that controls various devices and valves, and a second ECU that operates when the first ECU operates abnormally.

BRIEF DESCRIPTION OF THE DRAWINGS

These and/or other aspects of the disclosure will become apparent and more readily appreciated from the following description of the exemplary embodiments, taken in conjunction with the accompanying drawings, of which:

FIG. 1 is a hydraulic circuit diagram illustrating an electronic brake system according to a first embodiment of the disclosure, FIG. 2 is a hydraulic circuit diagram illustrating an operation in a first normal mode of the electronic brake system according to the first embodiment of the disclosure, FIG. 3 is a hydraulic circuit diagram illustrating an operation in a switching state of the electronic brake system according to the first embodiment of the disclosure, FIG. 4 is a hydraulic circuit diagram illustrating an operation in a second normal mode of the electronic brake system according to the first embodiment of the disclosure, FIG. 5 is a hydraulic circuit diagram illustrating an operation in a fallback mode of the electronic brake system according to the first embodiment of the disclosure, FIG. 6 is a hydraulic circuit diagram illustrating an electronic brake system according to a modified example of the first embodiment of the disclosure, FIG. 7 is a hydraulic circuit diagram illustrating an electronic brake system according to a second embodiment of the disclosure, FIG. 8 is a hydraulic circuit diagram illustrating an operation in a first normal mode of the electronic brake system according to the second embodiment of the disclosure, FIG. 9 is a hydraulic circuit diagram illustrating an operation in a switching state of the electronic brake system according to the second embodiment of the disclosure, FIG. 10 is a hydraulic circuit diagram illustrating an operation in a second normal mode of the electronic brake system according to the second embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a hydraulic circuit diagram showing an electronic brake system 1000 according to a first embodiment of the disclosure.

Referring to FIG. 1, the electronic brake system 1000 according to the first embodiment of the disclosure may include a first block 100 including a master cylinder 1200, a second block 200 including a pedal simulator 1250, a hydraulic pressure supply device 1300, and a hydraulic control unit 1400 and spaced apart from the first block 100, a plurality of electronic control units (ECUs) 300, and a connection line 1600 having one end connected to the first block 100 and the other end connected to the second block 200.

The first block 100 includes a mechanical unit connected and interworked with a brake pedal 10 to provide a mechanical operation, and the second block 200 includes an electrical unit electronically operated and controlled such as a valve and a sensor whose operation is controlled by an ECU 300. The first block 100 and the second block 200 are disposed to be spaced apart from each other in the vehicle and may be hydraulically connected by a plurality of connection lines 1600, thereby improving a vehicle installation of the electronic brake system 1000, and further, by promoting a degree of design freedom of the vehicle, efficient space arrangement may be possible.

The mechanical unit includes components and/or elements that perform a mechanical operation in conjunction with the brake pedal 10 irrespective of a control signal of the ECU, and may be disposed in the first block 100.

The first block 100 may include a main reservoir 1100*a* in which a pressurized medium such as a brake oil is stored, a master cylinder 1200 for pressurizing and discharging the pressurized media such as the brake oil accommodated inside in response to a pedal effort of the brake pedal 10, and main reservoir flow paths 1110*a* and 1120*a* connecting the main reservoir 1100*a* and the master cylinder 1200.

The master cylinder 1200 is configured to include at least one hydraulic chamber, and may pressurize and discharge the pressurizing medium inside. The master cylinder 1200 may include a first master chamber 1220*a*, a second master chamber 1230*a*, and a first master piston 1220 and a second master piston 1230 provided in each master chamber 1220*a* and 1230*a*.

The first master chamber 1220*a* may be formed on an inlet side (right side with reference to FIG. 1) of a cylinder block 1210 to which the brake pedal 10 is connected, and the first master piston 1220 may be reciprocally accommodated in the first master chamber 1220*a*.

In the first master chamber 1220*a*, the pressurized medium may be introduced and discharged through a first hydraulic port 1280*a* and a second hydraulic port 1280*b*. The first hydraulic port 1280*a* is connected to a first main reservoir flow path 1110*a* to be described later to introduce the pressurized medium from the main reservoir 1100*a* to the first master chamber 1220*a*. A pair of sealing members may be provided on a front (left side with reference to FIG. 1) and a rear (right side with reference to FIG. 1) of the first hydraulic port 1280*a* to seal the first master chamber 1220*a*. The second hydraulic port 1280*b* is connected to a first connection line 1610 to be described later so that the pressurized medium of the first master chamber 1220*a* is discharged to the first connection line 1610, or conversely, the pressurized medium may be introduced into the first master chamber 1220*a* from the first connection line 1610.

The first master piston 1220 is provided to be accommodated in the first master chamber 1220*a*, pressurizing the pressurized medium accommodated in the first master chamber 1220*a* by moving forward, or creating a negative pressure in the first master chamber 1220*a* by moving backward. Specifically, when the first master piston 1220 moves forward, as a volume of the first master chamber 1220*a* decreases, the pressurized medium present in the first master chamber 1220*a* may be pressurized to form a hydraulic pressure. On the contrary, when the first master piston 1220 moves backward, as the volume of the first master chamber 1220*a* increases, the pressure medium present in the first master chamber 1220*a* may be decompressed, and at the same time, a negative pressure may be formed in the first master chamber 1220*a*.

The second master chamber 1230*a* may be formed on the front side (left side with reference to FIG. 1) of the first master chamber 1220*a* on the cylinder block 1210, and the second master piston 1230*a* may be reciprocally accommodated in the second master chamber 1230*a*.

In the second master chamber 1230*a*, the pressurized medium may be introduced and discharged through a third hydraulic port 1280*c* and a fourth hydraulic port 1280*d*. The third hydraulic port 1280*c* is connected to a second main reservoir flow path 1120*a* to be described later to introduce the pressurized medium from the main reservoir 1100*a* to the second master chamber 1230*a*. A pair of sealing members may be provided on the front (left side with reference to FIG. 1) and the rear (right side with reference to FIG. 1) of the third hydraulic port 1280*c* to seal the second master chamber 1230*a*. The fourth hydraulic port 1280*d* is connected to a second connection line 420 to be described later so that the pressurized medium of the second master chamber 1230*a* is discharged to the second connection line 420, or conversely, the pressurized medium may be introduced into the second master chamber 1230*a* from the second connection line 420.

The second master piston 1230 is provided to be accommodated in the second master chamber 1230*a*, pressurizing the pressurized medium accommodated in the second master chamber 1230*a* by moving forward, or creating a negative pressure in the second master chamber 1230*a* by moving backward. Specifically, when the second master piston 1230 moves forward, as a volume of the second master chamber 1230*a* decreases, the pressurized medium present in the second master chamber 1230*a* is pressurized to form a hydraulic pressure. On the contrary, when the second master piston 1230 moves backward, as the volume of the second master chamber 1230*a* increases, the pressure medium present in the second master chamber 1230*a* may be decompressed, and at the same time, a negative pressure may be formed in the second master chamber 1230*a*.

A first piston spring 1220*b* and a second piston spring 1230*b* are provided to elastically support the first master piston 1220 and the second master piston 1230, respectively. To this end, the first piston spring 1220*b* may be disposed between a front surface (left end with reference to FIG. 1) of the first master piston 1220 and a rear surface (right end with reference to FIG. 1) of the second master piston 1230, and a second piston spring 1230*b* may be disposed between a front surface (left end with reference to FIG. 1) of the second master piston 1230 and an inner surface of the cylinder block 1210. When a displacement occurs in the first master piston 1220 and the second master piston 1230 according to an operation such as a braking etc., the first piston spring 1220*b* and the second piston spring 1230*b* are compressed, respectively. Thereafter, when the operation such as the braking, etc. is released, the first piston spring 1220*b* and the second piston spring 1230*b* expand by an elastic force and the first master piston 1220 and the second master piston 1230 may return to their original positions, respectively.

The main reservoir 1100a may accommodate and store the pressurized medium therein. The main reservoir 1100a may be connected to the master cylinder 1200 and a component such as a third connection line 1630 to be described later to supply or receive the pressurized medium.

The main reservoir 1100a may include a plurality of chambers divided by partitions 1105a. The main reservoir 1100a includes a plurality of main reservoir chambers 1101a, 1102a, and 1103a, and the plurality of main reservoir chambers 1101a, 1102a, and 1103a may be arranged side by side in a row. Specifically, the main reservoir 1100a may include a first main reservoir chamber 1101a disposed in a central portion, a second main reservoir chamber 1102a disposed at one side, and a third main reservoir chamber 1103a disposed at the other side.

The partitions 1105a may be provided between adjacent main reservoir chambers, respectively, and each partition 1105a may be provided with at least a part of an upper end thereof open. Accordingly, the adjacent main reservoir chambers 1101a, 1102a, and 1103a communicate with each other so that the pressurized medium may move. For example, when a large amount of the pressurized medium flows into the first main reservoir chamber 1101a, the pressurized medium passes through the upper end of the partition 1105a to be delivered the second main reservoir chamber 1102a or the third main reservoir chamber 1103a.

The first main reservoir chamber 1101a may be connected to the third connection line 1630 to be described later to supply the pressurized medium to a sub-reservoir 1100b or to receive the pressurized medium from the sub-reservoir 1100b. Furthermore, the second main reservoir chamber 1102a may be connected to the first main reservoir flow path 1110a to be described later to supply or receive the pressurized medium to the master cylinder 1200 side, and the third main reservoir chamber 1103a may be connected to the second main reservoir flow path 1120a to supply or receive the pressurized medium to the master cylinder 1200 side.

As such, since the main reservoir 1100a is divided into the first to third main reservoir chambers 1101a, 1102a, and 1103a, the electronic brake system 1000 may be operated stably. For example, when the main reservoir 1100a is formed as a single chamber and a capacity of the pressurized medium is not sufficient, the pressurized medium may not be stably supplied not only to the sub-reservoir 1100b but also to the master cylinder 1200 side. Accordingly, by separating the first main reservoir chamber 1101a in which the main reservoir 1100a is connected to the sub-reservoir 1100b of the second block 200 and the second and third main reservoir chambers 1102a and 1103a connected to the master cylinder 1200 side, even when the pressurized medium may not be supplied to any one component, the vehicle may be braked by supplying the pressurized medium to other components.

The main reservoir flow paths are provided to hydraulically connect the master cylinder 1200 and the main reservoir 1100a.

The main reservoir flow paths may include the first main reservoir flow path 1110a connecting the first master chamber 1220a and the second main reservoir chamber 1102a of the main reservoir 1100a, an the second main reservoir flow path 1120a connecting the second master chamber 1230a and the third main reservoir chamber 1103a of the main reservoir 1100a. To this end, one end of the first main reservoir flow path 1110a communicates with the first master chamber 1220a of the master cylinder 1200, and the other end communicates with the second main reservoir chamber 1102a of the main reservoir 1100a. Also, one end of the second main reservoir flow path 1120a communicates with the second master chamber 1230a of the master cylinder 1200 and the other end communicates with the third main reservoir chamber 1103a of the main reservoir 1100a.

The electrical unit may include a component that is electronically operated and controlled by a control signal of the ECU 300, and may be disposed in the second block 200.

The second block 200 may include a sub-reservoir 1100b for auxiliary storing the pressurized medium therein, a pedal simulator 1250 that provides a reaction force to a driver's pedal effort for the brake pedal 10, a hydraulic pressure supply device 1300 that receives a driver's braking intention as an electrical signal by a pedal displacement sensor 11 that detects a displacement of the brake pedal 10 and generates a hydraulic pressure of the pressurized medium through a mechanical operation, a hydraulic control unit 1400 that controls a hydraulic pressure supplied from the hydraulic pressure supply device 1300 and a hydraulic pressure transferred to the first to fourth wheel cylinders 21, 22, 23, and 24, a dump control unit 1800 that hydraulically connects the sub-reservoir 1100b and the hydraulic pressure supply device 1300 and controls the flow of the pressurized medium therebetween, a plurality of sub-reservoir flow paths 1710, 1720, 1730, and 1740 connecting the sub-reservoir 1100b to the first and second hydraulic circuits 1510 and 1520 and the dump control unit 1800 side, a plurality of cut valves 411 and 422a provided in the connection lines to control the flow of the pressurized medium, an inspection valve 1900 that inspects a leak of the master cylinder 1200, a circuit pressure sensor PS1 for detecting the hydraulic pressure of the pressurized medium provided by the hydraulic pressure supply device 1300, and a cylinder pressure sensor PS2 for detecting the hydraulic pressure of the second master chamber.

The ECU 300 may receive electrical signals detected by a variety of sensors, transmit electrical signals to components such as various devices and valves, and determine whether there is an abnormality.

For example, the ECU 300 may determine whether the abnormality thereof through signals detected by sensors such as the pedal displacement sensor 11 and the pressure sensors PS1 and PS2.

The ECU 300 may be provided in plurality and have a redundancy function. Specifically, the ECU 300 may include a first ECU 310 and a second ECU 320 to control. The first ECU 310 normally controls various devices and valves and the second ECU 320 may operate to control various devices and valves on behalf of the first ECU 310 when the first ECU 310 operates abnormally. In other words, when the first ECU 310 operates abnormally, a sensor recognizes whether there is an abnormality, and the ECU 300 blocks signals of the first ECU 310 and allows the second ECU 320 to control various devices and valves.

The sub-reservoir 1100b may be disposed in the second block 200 to store the pressurized medium as an auxiliary. As the second block 200 also stores the pressurized medium as an auxiliary by the sub-reservoir 1100b, within the second block 200 for example, the hydraulic pressure supply device 1300, the dump control unit 1800, and the first and second hydraulic circuits 1510 and 1520, etc., the pressurized medium may be smoothly supplied and received.

The sub-reservoir 1100b may be connected to the main reservoir 1100a of the first block 100 by the third connection line 1630 to be described later. Furthermore, the sub-reservoir 1100b may be respectively connected to the first hydraulic circuit 1510 and the second hydraulic circuit 1520 by a first sub-reservoir flow path 1710 and a second sub-reservoir flow path 1720 to be described later, and may be connected to the dump control unit 1800 by a third sub-reservoir passage 1730 and a fourth sub-reservoir passage 1740.

The hydraulic pressure supply device 1300 is provided to generate hydraulic pressure of the pressurized medium through mechanical operation by receiving the driver's braking intention as an electrical signal from the pedal displacement sensor 11 that detects the displacement of the brake pedal 10.

The hydraulic pressure supply device 1300 may include a hydraulic pressure supply unit that provides a pressure to the pressurized medium transmitted to the wheel cylinder 20, a motor (not shown) that generates a rotational force by an electrical signal from the pedal displacement sensor 11, and a power transmission unit (not shown) that converts a rotational motion into a linear motion and transmits to the hydraulic pressure supply unit.

The hydraulic pressure supply unit includes a cylinder block 1310 in which the pressurized medium is accommodated, a hydraulic piston 1320 accommodated in the cylinder block 1310, a sealing member 1350 provided between the hydraulic piston 1320 and the cylinder block 1310 for sealing pressure chambers 1330 and 1340, and a driving shaft 1390 for transmitting a power output from the power transmission unit to the hydraulic piston 1320.

The pressure chambers 1330 and 1340 may include a first pressure chamber 1330 positioned in a front (left direction of the hydraulic piston 1320 with reference to FIG. 1) of the hydraulic piston 1320 and a second pressure chamber 1340 positioned in a rear (right direction of the hydraulic piston 1320 with reference to FIG. 1) of the hydraulic piston 1320. In other words, the first pressure chamber 1330 is partitioned by the cylinder block 1310 and a front surface of the hydraulic piston 1320 and is provided so that the volume varies in response to a movement of the hydraulic piston 1320, and the second pressure chamber 1340 is partitioned by the cylinder block 1310 and a rear surface of the hydraulic piston 1320 and is provided so that the volume varies in response to the movement of the hydraulic piston 1320.

The first pressure chamber 1330 is connected to a first hydraulic flow passage 1401 to be described later through a first communication hole formed in the cylinder block 1310, and the second pressure chamber 1340 is connected to a second hydraulic flow passage 1402 to be described later through a second communication hole formed in the cylinder block 1310.

The sealing members may include a piston sealing member 1350a provided between the hydraulic piston 1320 and the cylinder block 1310 to seal between the first pressure chamber 1330 and the second pressure chamber 1340, and a drive shaft sealing member 1350b provided between the drive shaft 1390 and the cylinder block 1310 to seal openings of the second pressure chamber 1340 and the cylinder block 1310. The hydraulic pressure or negative pressure of the first pressure chamber 1330 and the second pressure chamber 1340 generated by a forward or backward movement of the hydraulic piston 1320 may be sealed by the piston sealing member 1350a and the drive shaft sealing member 1350b to be transmitted to the first hydraulic flow passage 1401 and the second hydraulic flow passage 1402 to be described later without a leakage. Furthermore, a chamber sealing member 1350c may be provided between the second pressure chamber 1340 and the driving shaft sealing member 1350b. The chamber sealing member 1350c allow the flow of the pressurized medium flowing into the second pressure chamber 1340 through an auxiliary inflow passage 1850 to be described later, but the flow of the pressurized medium leaking from the second pressure chamber 1340 to the auxiliary inflow passage 1850 may be blocked.

The motor (not shown) is provided to generate a driving force of the hydraulic piston 1320 by an electrical signal output from the ECU 300. The motor may include a stator and a rotor, and may provide a power for generating a displacement of the hydraulic piston 1320 by rotating in a forward or reverse direction. A rotation angular velocity and a rotation angle of the motor may be precisely controlled by a motor control sensor. Since the motor is a well-known technology, a detailed description thereof will be omitted.

The power transmission unit (not shown) is provided to convert the rotational force of the motor into the linear motion. The power transmission unit may be provided in a structure including, for example, a worm shaft (not shown), a worm wheel (not shown), and the drive shaft 1390.

The worm shaft may be integrally formed with a rotating shaft of the motor, and may rotate the worm wheel by having a worm formed on an outer circumferential surface thereof to be engaged with the worm wheel. The worm wheel may linearly move the drive shaft 190 by being connected to be engaged with the drive shaft 190, and the drive shaft 190 is connected to the hydraulic piston 1320 to operate integrally, through which the hydraulic piston 320 may be slidably moved within the cylinder block 1310.

Explaining the above operations again, when the displacement of the brake pedal 10 is detected by the pedal displacement sensor 11, the detected signal is transmitted to the ECU 300, and the ECU 300 drives the motor to rotate the worm shaft in one direction. The rotational force of the worm shaft is transferred to the drive shaft 1390 via the worm wheel, and the hydraulic piston 1320 connected to the drive shaft 1390 advances in the cylinder block 1310, thereby generating a hydraulic pressure in the first pressure chamber 1330.

Conversely, when the pedal effort of the brake pedal 10 is released, the ECU 300 drives the motor to rotate the worm shaft in the opposite direction. Accordingly, the worm wheel also rotates in the opposite direction, and the hydraulic piston 1320 connected to the drive shaft 1390 moves backward in the cylinder block 1310, thereby generating a negative pressure in the first pressure chamber 1330.

The generation of hydraulic pressure and negative pressure in the second pressure chamber 1340 may be implemented by operating in opposite to the above directions. In other words, when the displacement of the brake pedal 10 is detected by the pedal displacement sensor 11, the detected signal is transmitted to the ECU 300, and the ECU 300 drives the motor to rotate the worm shaft in the opposite direction. The rotational force of the worm shaft is transferred to the drive shaft 1390 via the worm wheel, and the hydraulic piston 1320 connected to the drive shaft 1390 moves backward in the cylinder block 1310, thereby generating a hydraulic pressure in the second pressure chamber 1340.

Conversely, when the pedal effort of the brake pedal 10 is released, the ECU drives the motor to rotate the worm shaft in one direction. Accordingly, the worm wheel also rotates in the opposite direction and the hydraulic piston 1320 connected to the drive shaft 1390 advances in the cylinder block 1310, thereby generating a negative pressure in the second pressure chamber 1340.

As such, the hydraulic pressure supply device 1300 may generate a hydraulic pressure or negative pressure in the first pressure chamber 1330 and the second pressure chamber 1340, respectively, depending on the rotation direction of the worm shaft by the operation of the motor, and whether a hydraulic pressure is transferred to the chambers to perform braking or whether a negative pressure is generated in the chambers to release braking may be determined by controlling the valves.

On the other hand, the power transmission unit according to an embodiment is not limited to any one structure as long as it may convert the rotational motion of the motor into the linear motion of the hydraulic piston 1320, and it should be understood the same even if it consists of devices of various structures and methods.

The hydraulic pressure supply device 1300 may be hydraulically connected to the sub-reservoir 1100*b* by the dump control unit 1800. The dump control unit 1800 may include a first dump control unit that controls the flow of the pressurized medium between the first pressure chamber 1330 and the sub-reservoir 1100*b*, and a second dump control unit that controls the flow of the medium the pressure between the second pressure chamber 1340 and the sub-reservoir 1100*b*. The first dump control unit may include a first dump flow path 1810 connecting the first pressure chamber 1330 and the sub-reservoir 1100*b*, and a first bypass flow path 1830 rejoining after branching on the first dump flow path 1810. The second dump control unit may include a second dump flow path 1820 connecting the second pressure chamber 1340 and the sub-reservoir 1100*b*, and a second bypass flow path 1840 rejoining after branching on the second dump flow path 1820.

A first dump check valve 1811 and a first dump valve 1831 for controlling the flow of the pressurized medium may be provided in the first dump flow path 1810 and the first bypass flow path 1830, respectively. The first dump check valve 1811 may be provided to allow only the flow of the pressurized medium from the sub-reservoir 1100*b* to the first pressure chamber 1330, and block the flow of the pressurized medium in the opposite direction. The first bypass flow path 1830 is connected to the first dump flow path 1810 to be parallel to the first dump check valve 1811, and a first dump valve 1831 for controlling the flow of the pressurized medium between the first pressure chamber 1330 and the sub-reservoir 1100*b* may be provided in the first bypass flow path 1830. In other words, the first bypass flow passage 1830 may be connected by bypassing front and rear ends of the first dump check valve 1811 on the first dump flow path 1810, and the first dump valve 1831 may be provided as a two-way solenoid valve that controls the flow of the pressurized medium between the first pressure chamber 1330 and the sub-reservoir 1100*b*. The first dump valve 1831 may be provided as a normally closed type solenoid valve that is normally closed and operates to open the valve when an electrical signal is received from the ECU 300.

A second dump check valve 1821 and a second dump valve 1841 for controlling the flow of the pressurized medium may be provided in the second dump flow path 1820 and the second bypass flow path 1840, respectively. The second dump check valve 1821 may be provided to allow only the flow of the pressurized medium from the sub-reservoir 1100*b* to the second pressure chamber 1340, and block the flow of the pressurized medium in the opposite direction. A second bypass flow path 1840 is connected to the second bypass flow path 1840 to be parallel to the second dump check valve 1821, and a second dump valve 1841 for controlling the flow of the pressurized medium between the second pressure chamber 1340 and the sub-reservoir 1100*b* may be provided in the second bypass flow path 1840. In other words, the second bypass flow path 1840 may be connected by bypassing the front and rear ends of the second dump check valve 1821 on the second dump flow path 1820, and the second dump valve 1841 may be provided as a two-way solenoid valve that controls the flow of the pressurized medium between the second pressure chamber 1340 and the sub-reservoir 1100*b*. The second dump valve 1841 may be provided as a normally open type solenoid valve that is normally open and operates to be closed the valve when an electrical signal is received from the ECU 300.

Furthermore, the dump control unit 1800 may include the auxiliary inflow passage 1850 connecting the sub-reservoir 1100*b* and the second pressure chamber 1340 to fill the second pressure chamber 1340 with the pressurized medium. The auxiliary inflow passage 1850 may be connected to a rear (right side with reference to FIG. 1) of the chamber sealing member 1350*c* on the cylinder body 1310. Accordingly, the pressurized medium may be introduced into the second pressure chamber 1340 from the sub-reservoir 1100*b* through the auxiliary inflow passage 1850, but the flow of the leaking pressurized medium from the second pressure chamber 1340 to the auxiliary inflow passage (1340) by the chamber sealing member 1350*c* may be blocked.

The hydraulic control unit 1400 may be provided to control the hydraulic pressure transferred to each wheel cylinder 20, and the ECU may be provided to control the hydraulic pressure supply device 1300 and various valves based on hydraulic pressure information and pedal displacement information.

The hydraulic control unit 1400 may include a second hydraulic circuit 1520 for controlling the flow of hydraulic pressure transferred to first and second wheel cylinders 21 and 22 among the four wheel cylinders 20, and a first hydraulic circuit 1510 for controlling the flow of hydraulic pressure transferred to third and fourth wheel cylinders 23 and 24, and include a plurality of flow paths and valves to control the hydraulic pressure transferred from the hydraulic pressure supply device 1300 to the wheel cylinders 20.

The first hydraulic flow passage 1401 is provided to be in communication with the first pressure chamber 1330 and the second hydraulic flow passage 1402 may be provided to be in communication with the second pressure chamber 1340. After the first hydraulic flow passage 1401 and the second hydraulic flow passage 1402 join into a third hydraulic flow passage 1403, the first hydraulic flow passage 1401 and the second hydraulic flow passage 1402 may be provided by branching again into a fourth hydraulic flow passage 1404 connected to the second hydraulic circuit 1520 and a fifth hydraulic flow passage 1405 connected to the first hydraulic circuit 1510.

A sixth hydraulic flow passage 1406 is provided to be in communication with the second hydraulic circuit 1520, and a seventh hydraulic flow passage 1407 may be provided to be in communication with the first hydraulic circuit 1510. After the sixth and seventh hydraulic passages 1406 and 1407 join into an eighth hydraulic flow passage 1408, the sixth and seventh hydraulic passages 1406 and 1407 may be provided by branching again into a ninth hydraulic flow passage 1409 communicating with the first pressure chamber 1330 and a tenth hydraulic flow passage 1410 communicating with the second pressure chamber 1340.

A first valve 1431 for controlling the flow of the pressurized medium may be provided in the first hydraulic flow passage 1401. The first valve 1431 may be provided as a check valve that allows only the flow of the pressurized medium discharged from the first pressure chamber 1330 and blocks the flow of the pressurized medium in the opposite direction. Furthermore, a second valve 1432 for controlling the flow of the pressurized medium may be provided in the second hydraulic flow passage 1402. The second valve 1432 may be provided as a check valve that allows only the flow of the pressurized medium discharged from the second pressure chamber 1340 and blocks the flow of the pressurized medium in the opposite direction.

The fourth hydraulic flow passage 1404 is branched again from the third hydraulic flow passage 1403 where the first hydraulic flow passage 1401 and the second hydraulic flow passage 1402 join and is connected to the second hydraulic circuit 1520. A third valve 1433 for controlling the flow of the pressurized medium may be provided in the fourth hydraulic flow passage 1404. The third valve 1433 may be provided as a check valve that allows only the flow of the pressurized medium from the third hydraulic passage 1403 toward the second hydraulic circuit 1520 and blocks the flow of the pressurized medium in the opposite direction.

The fifth hydraulic flow passage 1405 is branched again from the third hydraulic flow passage 1403 where the first hydraulic flow passage 1401 and the second hydraulic flow passage 1402 join and is connected to the first hydraulic circuit 1510. A fourth valve 1434 for controlling the flow of the pressurized medium may be provided in the fifth hydraulic flow passage 1405. The fourth valve 1434 may be provided as a check valve that allows only the flow of the pressurized medium from the third hydraulic passage 1403 toward the first hydraulic circuit 1510 and blocks the flow of the pressurized medium in the opposite direction.

The sixth hydraulic flow passage 1406 communicates with the second hydraulic circuit 1520, the seventh hydraulic flow passage 1407 communicates with the first hydraulic circuit 1510, and are provided to join into the eighth hydraulic flow passage 1408. A fifth valve 1435 for controlling the flow of the pressurized medium may be provided in the sixth hydraulic flow passage 1406. The fifth valve 1435 may be provided as a check valve that allows only the flow of the pressurized medium discharged from the second hydraulic circuit 1520 and blocks the flow of the pressurized medium in the opposite direction. Furthermore, a sixth valve 1436 for controlling the flow of the pressurized medium may be provided in the seventh hydraulic flow passage 1407. The sixth valve 1436 may be provided as a check valve that allows only the flow of the pressurized medium discharged from the first hydraulic circuit 1510 and blocks the flow of the pressurized medium in the opposite direction.

The ninth hydraulic flow path 1409 is branched from the eighth hydraulic flow passage 1408 where the sixth hydraulic flow passage 1406 and the seventh hydraulic flow passage 1407 join and is connected to the first pressure chamber 1330. A seventh valve 1437 for controlling the flow of the pressurized medium may be provided in the ninth hydraulic flow passage 1409. The seventh valve 1437 may be provided as a two-way control valve for controlling the flow of the pressurized medium transferred along the ninth hydraulic flow passage 1409. The seventh valve 1437 may be provided as a normally closed type solenoid valve that is normally closed and operates to open the valve when an electrical signal is received from the ECU 300.

The tenth hydraulic flow passage 1410 is branched from the eighth hydraulic flow passage 1408 where the sixth hydraulic flow passage 1406 and the seventh hydraulic flow passage 1407 join and is connected to the second pressure chamber 1340. An eighth valve 1438 for controlling the flow of the pressurized medium may be provided in the tenth hydraulic flow passage 1410. The eighth valve 1438 may be provided as a two-way control valve for controlling the flow of the pressurized medium transferred along the tenth hydraulic flow passage 1410. Like the seventh valve 1437, the eighth valve 1438 is a normally closed solenoid valve that is normally closed and operates to open the valve when an electrical signal is received from the ECU 300.

By the arrangement of the hydraulic flow passages and valves of the hydraulic control unit 1400 as describes above, the hydraulic pressure formed in the first pressure chamber 1330 according to the forward movement of the hydraulic piston 1320 may be transferred to the second hydraulic circuit 1520 by sequentially passing through the first hydraulic flow passage 1401, the third hydraulic flow passage 1403, and the fourth hydraulic flow passage 1404, and may be transferred to the first hydraulic circuit 1510 by sequentially passing through the first hydraulic flow passage 1401 and the fifth hydraulic flow passage 1405. Furthermore, the hydraulic pressure formed in the second pressure chamber 1340 according to the backward movement of the hydraulic piston 1320 may be transferred to the second hydraulic circuit 1520 by sequentially passing through the second hydraulic flow passage 1402 and the fourth hydraulic flow passage 1404, and may be transferred to the first hydraulic circuit 1510 by sequentially passing through the second hydraulic flow passage 1402, the third hydraulic flow passage 1403, and the fifth hydraulic flow passage 1405.

Conversely, the negative pressure formed in the first pressure chamber 1330 according to the backward movement of the hydraulic piston 1320 may recover the pressure medium provided to the second hydraulic circuit 1520 to the first pressure chamber 1330 by sequentially passing through the sixth hydraulic flow passage 1406, the eighth hydraulic flow passage 1408, and the ninth hydraulic flow passage 1409, and may recover the pressurized medium provided to the first hydraulic circuit 1510 to the first pressure chamber 1330 by sequentially passing through the seventh hydraulic flow passage 1407, the eighth hydraulic flow passage 1408, and the ninth hydraulic flow passage 1409. Furthermore, the negative pressure formed in the second pressure chamber 1340 according to the forward movement of the hydraulic piston 1320 may recover the pressurized medium provided to the second hydraulic circuit 1520 to the second pressure chamber 1340 by sequentially passing through the sixth hydraulic flow passage 1406, the eighth hydraulic flow passage 1408, and the tenth hydraulic flow passage 1410, and may recover the pressurized medium provided to the first hydraulic circuit 1510 to the second pressure chamber 1340 by sequentially passing through the seventh hydraulic flow passage 1407, the eighth hydraulic flow passage 1408, and the tenth hydraulic flow passage 1410.

The second hydraulic circuit 1520 of the hydraulic control unit 1400 may control the hydraulic pressure in the first and second wheel cylinders 21 and 22, which are two wheel cylinders 20 among the four wheels RR, RL, FR, and FL, and the first hydraulic circuit 1510 may control the hydraulic pressure in the third and fourth wheel cylinders 23 and 24 which are the other two wheel cylinders 20.

The second hydraulic circuit 1520 may receive the hydraulic pressure through the fourth hydraulic flow passage 1404 and discharge the hydraulic pressure through the sixth hydraulic flow passage 1406. To this end, as shown in FIG. 1, the fourth hydraulic flow passage 1404 and the sixth hydraulic flow passage 1406 join, and then may be provided to be branched into two flow passages connected to the first wheel cylinder 21 and the second wheel cylinder 22. Furthermore, the first hydraulic circuit 1510 may receive the hydraulic pressure through the fifth hydraulic flow passage 1405 and discharge the hydraulic pressure through the seventh hydraulic flow passage 1407, and accordingly, as shown in FIG. 1, after the fifth hydraulic flow passage 1405 and the seventh hydraulic flow passage 1407 join, and may be provided to be branched into two flow passages connected to the third wheel cylinder 23 and the fourth wheel cylinder 24. However, the connection of the hydraulic flow passages shown in FIG. 1 is not limited to the structure as an example for helping the understanding of the disclosure. For example, the fourth hydraulic flow passage 1404 and the sixth hydraulic flow passage 1406 may be connected to the second hydraulic circuit 1520 side, respectively and may be branched and connected independently into the first wheel cylinder 21 and the second wheel cylinder 22. Similarly, the fifth hydraulic flow passage 1405 and the seventh hydraulic flow passage 1407 may be connected to the first hydraulic circuit 1510 side, respectively and may be branched and connected independently into the third wheel cylinder 23 and the fourth wheel cylinder 24. Accordingly, the connection of the hydraulic flow passages should be understood in the same way even when it is connected in various ways and structures, such as described above.

The first and second hydraulic circuits 1510 and 1520 may include first to fourth inlet valves 1511a, 1511b, 1521a, and 1521b for controlling the flow of the pressurized medium toward the first to fourth wheel cylinders 21, 22, 23, and 24, respectively. The first to fourth inlet valves 1511a, 1511b, 1521a, and 1521b are disposed on an upstream side of the first to fourth wheel cylinders 21, 22, 23, and 24, respectively and may be provided as a normally open type solenoid valves that is normally open and operates to be closed the valve when an electrical signal is received from the ECU 300.

The first and second hydraulic circuits 1510 and 1520 may include first to fourth check valves 1513a, 1513b, 1523a, and 1523b provided to be connected in parallel to the first to fourth inlet valves 1511a, 1511b, 1521a, and 1521b. The first to fourth check valves 1513a, 1513b, 1523a, and 1523b may be provided in bypass flow paths to connect front and rear sides of the first to fourth inlet valves 1511a, 1511b, 1521a, 1521b on the first and second hydraulic circuits 1510 and 1520, and may only allow the flow of the pressurized medium discharged from the respective wheel cylinders and may block the flow of the pressurized medium from the hydraulic pressure supply device 1310 to the wheel cylinders. The first to fourth check valves 1513a, 1513b, 1523a, and 1523b may quickly release the hydraulic pressure of the pressurized medium applied to each wheel cylinder, and when the first to fourth inlet valves 1511a, 1511b, 1521a, and 1521b does not operate normally, the hydraulic pressure of the pressurized medium applied to the wheel cylinder may be smoothly discharged.

The second hydraulic circuit 1520 may include first and second outlet valves 1522a and 1522b for controlling the discharge of the pressurized medium to improve performance when braking of the first and second wheel cylinders 21 and 22 is released. The first and second outlet valves 1522a and 1522b may discharge the pressurized medium applied to the first and second wheel cylinders 21 and 22 to the sub-reservoir 1100b to be described later through the second sub-reservoir flow path 1720 by being selectively opened when decompression braking such as an anti-lock brake system (ABS) dump mode is required by detecting the braking pressure of the first and second wheel cylinders 21 and 22. The first and second outlet valves 1522a and 1512b may be provided as a normally closed type solenoid valve that is normally closed and operates to open the valve when an electrical signal is received from the ECU 300.

The first hydraulic circuit 1510 may include third and fourth outlet valves 1512a and 1512b for controlling the discharge of the pressurized medium to improve performance when the braking of the third and fourth wheel cylinders 23 and 24 is released. The third and fourth outlet valves 1512a and 1512b may discharge the pressurized medium applied to the third and fourth wheel cylinders 23 and 24 to the sub-reservoir 1100b to be described later through the first sub-reservoir flow path 1710 by being selectively opened when decompression braking such as the ABS dump mode is required by detecting the braking pressure of the third and fourth wheel cylinders 23 and 24. The third and fourth outlet valves 1512a and 1512b may be provided as a normally closed type solenoid valve that is normally closed and operates to open the valve when an electrical signal is received from the ECU 300.

An outlet flow path 1530 may be provided to connect the first hydraulic circuit 1510 and the sub-reservoir 1100b to control the discharge of the pressurized medium from the third and fourth wheel cylinders 23 and 24. A first cut valve 1531 for controlling the discharge of the pressurized medium may be provided on the outlet flow path 1530. The first cut valve 1531 may be provided as a normally open type solenoid valve that is normally open and operates to be closed the valve when an electrical signal is received from the ECU 300.

In a normal operation mode, which is a general braking situation, the first cut valve 1531 is controlled to be closed, so that the pressurized medium supplied to the first hydraulic circuit 1510 does not leak to the sub-reservoir 110b and may be stably supplied to the third and fourth wheel cylinders 23 and 24.

The pedal simulator 1250 provides the reaction force to the driver's pedal effort for the brake pedal 10.

The pedal simulator 1250 has a front end connected to the first connection line 1610 to be described later, and a rear end connected to the sub-reservoir 1100b through a simulator discharge passage 1251.

The pedal simulator 1250 may include a simulation piston 1252a that is provided to be displaceable by the pressurized medium introduced through the first connection line 1610, a simulation chamber 1252b whose volume is changed by displacement of the simulation piston 1252a and communicating with a rear end of the simulator discharge passage 1251, and a simulation spring 1252c elastically supporting the simulation piston 1252a.

The simulation piston 1252a is provided to be displaceable in the simulation chamber 1252b by the pressurized medium introduced through the first connection line 1610. Specifically, the hydraulic pressure of the pressurized medium flowing in through the first connection line 1610 is delivered to a front surface (right side with reference to FIG. 1) of the simulation piston 1252a, and causes a displacement in the simulation piston 1252a. And, as the volume of the simulation chamber 1252b formed on a rear surface (left side with reference to FIG. 1) of the simulation piston 1252a by the displacement of the simulation piston 1252a decreases, the pressurized medium accommodated in the simulation chamber 1252b may be supplied to the sub-reservoir 1100b through the simulator discharge passage 1251. The simulation spring 1252c is compressed according to the displacement of the simulation piston 1252a by elastically supporting the simulation piston 1252a, so that an elastic restoring force therefor may be provided to the driver as a pedal feeling.

On the other hand, in the drawings, as an example, the simulation spring 1252c is illustrated as a coil spring, but in addition to providing an elastic force to the simulation piston 1252a and providing an elastic restoring force, various structures may be possible. For example, the simulation spring may be made of a material such as a rubber, or may be formed of various members capable of storing an elastic force such as a leaf spring.

The simulator discharge passage 1251 may be connected to a rear end of the pedal simulator 1250 so that one end thereof communicates with the simulation chamber 1252b and the other end thereof joins the first sub-reservoir flow path 1710 to be described later. Through this, by connecting the simulation chamber 1252b and the sub-reservoir 1100b, the pressurized medium discharged from the simulation chamber 1252b may be supplied to the sub-reservoir 1100b, or conversely, the pressurized medium may be supplied from the sub-reservoir 1100b to the simulation chamber 1252b.

An operation of the pedal simulator 1250 will be described. When the driver depresses the brake pedal 10 to apply the pedal effort, the first master piston 1220 advances and the pressurized medium in the first master chamber 1220a is supplied and pressurized to the front surface of the simulation piston 1252a through the first connection line 1610. Accordingly, as displacement occurs in the simulation piston 1252a, the simulation spring 1252c is compressed, and the elastic restoring force of the simulation spring 1252c may be provided to the driver as the pedal feeling. At this time, the pressurized medium accommodated in the simulation chamber 1252b is transferred to the sub-reservoir 1100b through the simulator discharge passage 1251 and the first sub-reservoir flow path 1710. Thereafter, when the driver releases the pedal effort for the brake pedal 10, the simulation spring 1252c expands by the elastic restoring force and the simulation piston 1252a returns to its original position, and the pressurized medium that pressurizes the front surface of the simulation piston 1252a returns to the first master chamber 1220a through the first connection line 1610. The pressurized medium is supplied to the simulation chamber 1252b sequentially passing though the sub-reservoir 1100b, the first sub-reservoir flow path 1710, and the simulator discharge passage 1251, so that the inside of the simulation chamber 1252b may be filled with the pressurized medium again.

As such, because the inside of the simulation chamber 1252b is always filled with the pressurized medium, a friction of the simulation piston 1252a is minimized when the pedal simulator 1250 is operated, so that a durability of the pedal simulator 1250 is improved, as well as an inflow of foreign substances from external may be blocked.

Furthermore, the pedal simulator 1250 of the disclosure is connected to the first master chamber 1220a through the first connection line 1610 to form the pedal feeling, but since it does not include a simulator valve, the pedal feeling may always be formed in the case of the ECU 300 being operates normally or abnormally. Furthermore, since the pedal simulator 1250 may maintain the pedal feeling to the driver even at the moment of the switching operation when the second ECU 320 operates due to abnormal operation of the first ECU 310, there is an advantage of reducing discomfort caused by a kickback.

On the other hand, the sub-reservoir 1100b may include a plurality of chambers divided by the partitions 1105b. The sub-reservoir 1100b includes a plurality of sub-reservoir chambers 1101b, 1102b, and 1103b, and the plurality of sub-reservoir chambers 1101b, 1102b, and 1103b may be arranged side by side in a row. Specifically, the sub-reservoir 1100b may include a first sub-reservoir chamber 1101b disposed in a central portion, a second sub-reservoir chamber 1102b disposed at one side, and a third sub-reservoir chamber 1103b disposed at the other side.

The partitions 1105b may be provided between adjacent sub-reservoir chambers, and each partitions 1105b may be provided with at least a part of an upper end thereof open. Accordingly, the adjacent sub-reservoir chambers 1101b, 1102b, and 1103b communicate with each other so that the pressurized medium may move. For example, when a large amount of the pressurized medium flows into the first sub-reservoir chamber 1101b, the pressurized medium passes through the upper end of the partitions 1105b to be transferred the second sub-reservoir chamber 1102b or the third sub-reservoir chamber 1103b.

The first sub-reservoir chamber 1101b and the third sub-reservoir chamber 1103b may be connected to the first dump control unit and the second dump control unit, respectively, and the second sub-reservoir chamber 1102b is connected to the third connection line 1630 to be described later and the first and second hydraulic circuits 1510 and 1520, so that the pressurized medium may be transferred to each other.

As such, since the sub-reservoir 1100b is divided into the first to third sub-reservoir chambers 1101b, 1102b, and 1103b, the electronic brake system 1000 may be operated stably. For example, when the sub-reservoir 1100b is formed as a single chamber and a capacity of the pressurized medium is not sufficient, the pressurized medium may not be stably supplied not only to the main reservoir 1100a, but also to the dump control unit 1800 and the hydraulic pressure supply device 1300. Accordingly, by separating the sub-reservoir 1100b into the first to third sub-reservoir chambers 1101b, 1102b, and 1103b, even when the pressurized medium may not be supplied to any one component, the vehicle may be braked by supplying the pressurized medium to other components.

The sub-reservoir flow paths are provided to hydraulically connect the first hydraulic circuit 1510, the second hydraulic circuit 1520, and the hydraulic pressure supply device 1300 to the sub-reservoir 1100b. The sub-reservoir flow paths may include the first sub-reservoir flow path 1710 connecting the sub-reservoir 1100b and the rear end of the first hydraulic circuit 1510, the second sub-reservoir flow path 1720 connecting the sub-reservoir 1100b and the rear end of the second hydraulic circuit 1520, the third sub-reservoir flow path 1730 connecting the sub-reservoir 1100b and the first dump control unit, and the fourth sub-reservoir 1740 connecting the sub-reservoir 1100b and the second dump control unit.

The first sub-reservoir flow path 1710 has one end connected to the second sub-reservoir chamber 1102b of the sub-reservoir 1100b and the other end connected to a downstream side of the third and fourth outlet valves 1522a and 1522b of the first hydraulic circuit 1510, and the simulator discharge passage 1251 may join at the middle portion thereof. Furthermore, the second sub-reservoir flow path 1720 has one end connected to the second sub-reservoir chamber 1102b of the sub-reservoir 1100b and the other end connected to a downstream side of the first and second outlet valves 1512a and 1512b of the second hydraulic circuit 1520. Furthermore, the third sub-reservoir flow path 1730 has one end connected to the third sub-reservoir chamber 1103b of the sub-reservoir 1100b and the other end connected to the first dump control unit side, and the fourth sub-reservoir flow path 1740 has one end connected to the first sub-reservoir chamber 1101b of the sub-reservoir 1100b and the other end connected to the second dump control unit side.

The inspection valve 1900 is provided to diagnose or determine whether the master cylinder 1200 has a leak. The inspection valve 1900 may be provided at the front end of the pedal simulator 1250 on the first connection line 1610 to be described later to control the flow of the pressurized medium. The inspection valve 1900 may inspect whether the master cylinder 1200 is leaking by blocking the discharge of the pressurized medium from the first master chamber 1220a through the first connection line 1610 in an inspection mode. To this end, the inspection valve 1900 may be provided as a normally open type solenoid valve that is normally open and operates to be closed when an electrical signal is received from the ECU.

The second block 200 may include the circuit pressure sensor PS1 for detecting the hydraulic pressure of the pressurized medium provided by the hydraulic pressure supply device 1300, and the cylinder pressure sensor PS2 for detecting the hydraulic pressure of the second master chamber 1230a. The circuit pressure sensor PS1 is provided on the first hydraulic circuit 1510 side and may detect the hydraulic pressure of the pressurized medium generated and provided from the hydraulic pressure supply device 1300 and transferred to the first hydraulic circuit 1510. The cylinder pressure sensor PS2 may be provided between the second master chamber 1230a and a second cut valve 1621 on the second connection line 1620 to be described later to detect the hydraulic pressure of the pressurized medium in the second master chamber 1230a. Information on a pressure value of the pressurized medium detected by the circuit pressure sensor PS1 and the cylinder pressure sensor PS2 may be transmitted to the ECU 300, and the ECU 300 may perform the inspection mode based on a value of the hydraulic pressure detected by the circuit pressure sensor PS1 and a value of the hydraulic pressure detected by the cylinder pressure sensor PS2 or obtain driving or braking information of the vehicle.

Furthermore, the second block 200 may include the first cut valve 1531 provided on the outlet flow path 1530 to control the flow of the pressurized medium, and the second cut valve 1621 provided to the second connection line 1620 to control the flow of the pressurized medium. A detailed description thereof will be provided later.

The connection lines 1600 are provided to connect the first block 100 and the second block 200 spaced apart from each other.

The connection lines 1600 may include the first connection line 1610 connecting the master cylinder 1200 of the first block 100 to the pedal simulator 1250 side of the hydraulic control unit 1400, the second connection line 1620 connecting the master cylinder 1200 to the second hydraulic circuit 1520 side of the hydraulic control unit 1400, and the third connection line 1630 connecting the main reservoir 1100a of the first block 100 and the sub-reservoir 1100b of the second block 200 to each other.

One end of the first connection line 1610 may be connected to the first master chamber 1220a of the master cylinder 1200, and the other end thereof may be connected to the front end side of the pedal simulator 1250.

One end of the second connection line 1620 may be connected to the second master chamber 1230a of the master cylinder 1200 and the other end thereof may be connected to the downstream or the rear end side of the first and second inlet valves 1511a and 1512a of the second hydraulic circuit 1520.

The second cut valve 1621 may be provided to the second connection line 1620 to control the flow of the pressurized medium between the second master chamber 1230a of the master cylinder 1200 and the second hydraulic circuit 1520. The second cut valve 1621 may be provided as a normally open type solenoid valve that is normally open and operates to be closed the valve when a closing signal is received from the ECU 300.

In the normal operation mode, which is the general braking situation, the second cut valve 1621 is controlled to be closed, so that the pressurized medium accommodated in the second master chamber 1230a is not transferred to the second hydraulic circuit 1520 side despite the pedal effort of the brake pedal 10. Furthermore, in the normal operation mode, the second cut valve 1621 is controlled to be closed, so that the hydraulic pressure of the pressurized medium supplied from the hydraulic pressure supply device 1300 does not leak to the master cylinder 1200 along the second connection line 1620 and may be stably supplied toward the wheel cylinders 21, 22, 23, and 24.

However, in a fallback mode, which is switched when the ECU 300 operates abnormally by a failure or malfunction, by being placed the second cut valve 1621 in an open state, and thus the pressurized medium discharged from the second master chamber 1230a of the master cylinder 1200 is supplied to the first and second wheel cylinders 21 and 22 through the second connection line 1620, thereby implementing braking.

One end of the third connection line 1630 may be in communication with the main reservoir 1100a, and the other end thereof may be in communication with the sub-reservoir 1100b. The third connection line 1630 allows transferring of the pressurized medium between the reservoirs when the pressurized medium is excessively large or small in one side of the reservoirs, thereby promoting smooth supply of the pressurized medium to each component.

The first connection line 1610 and the second connection line 1620 may be provided with a pipe having a predetermined strength, and the third connection line 1630 may be provided with a hose having an elasticity. Since the first connection line 1610 and the second connection line 1620 transfer the pressurized medium in which the hydraulic pressure is formed from the first and second master chambers 1220a and 1230a, a pipe having strength to withstand the hydraulic pressure is provided, thereby promoting durability and performance of the product. On the other hand, the third connection line 1630 is provided in connection with the main reservoir 1100a or the sub-reservoir 1100b, which have an internal pressure of the atmospheric pressure level, and thus the pressurized medium in which the hydraulic pressure is not formed is transferred. Therefore, the third connection line 1630 may be provided with a hose having the elasticity to promote ease of installation according to the arrangement position of the first block 100 and the second block 200. The first connection line 1610 and the second connection line 1620 may be installed on a vehicle body by a fastening member (not shown) having a predetermined restoring force so as to maintain connectivity even in the event of an impact such as a vehicle accident.

Hereinafter, an operation of the electronic brake system 1000 according to the first embodiment of the disclosure will be described.

The electronic brake system 1000 according to the first embodiment of the disclosure includes a plurality of ECUs 310 and 320, and then may be controlled and operated by the first ECU 310 and the second ECU 320 during normal operation. Specifically, the electronic brake system 1000 may operate a first normal mode controlled by the first ECU 310, and a second normal mode controlled by the second ECU 320 when the first ECU 310 operates abnormally.

At this time, the electronic brake system 1000 according to the first embodiment of the disclosure, when switching from the first normal mode to the second normal mode, may operate in a switching state, which is a temporary abnormal state. Herein, the switching from the first normal mode to the second normal mode may refers to in a state before the first ECU 310 operates abnormally and recognizes it, and the second ECU 320 operates.

Furthermore, the electronic brake system 1000 according to the first embodiment of the disclosure may operate in the fallback mode when all of the plurality of ECUs 300 operate abnormally.

In other words, the electronic brake system 1000 according to the first embodiment of the disclosure may sequentially implement the following operations. That is, the electronic brake system 1000 operates in the first normal mode to be controlled by the first ECU 310 during the normal operation, operates in the switching state until the second ECU 320 operates when the first ECU 310 operate abnormally, and operates in the second normal mode to be controlled by the second ECU 320.

FIG. 2 is a hydraulic circuit diagram illustrating an operation of the electronic brake system 1000 in the first normal mode according to the first embodiment of the disclosure.

Referring to FIG. 2, in the first normal mode of the electronic brake system 1000 according to the first embodiment of the disclosure, various devices and valves operate normally, and the various devices and valves may be controlled by the first ECU 310.

In the first normal mode, when the driver depresses on the brake pedal 10, the pedal sensor 11 detects the pedal effort and transmits an electrical signal to the first ECU 310. Accordingly, the first ECU 310 transmits electrical signals to various devices and valves to generate hydraulic pressure in the hydraulic pressure supply device 1300 and then to provide the hydraulic pressure of the pressurized medium to the wheel cylinders 21, 22, 23, and 24 through the hydraulic control unit 1400 and the first and second hydraulic circuits 1510 and 1520.

In the first normal mode, the first cut valve 1531 provided in the outlet flow path 1530 is switched to be closed so that the hydraulic pressure acting on the first hydraulic circuit 1510 does not leak, and the second cut valve 1621 provided in the second connection line 1620 to implement braking to the wheel cylinders 21, 22, 23, and 24 by the hydraulic pressure supply device 1300 is switched to be closed, thereby preventing transmission of the pressurized medium discharged from the master cylinder 1200 to the wheel cylinder 20 side.

When the pedal effort is applied to the brake pedal 10, the first master piston 1220 advances, and the pressurized medium accommodated in the first master chamber 1220a is transferred to the pedal simulator 1250 through the first connection line 1610. Accordingly, the simulation spring 1252c is elastically deformed by the displacement of the simulation piston 1252a, and the elastic restoring force of the simulation spring 1252c is provided to the driver as the pedal feeling. At this time, the pressurized medium accommodated in the simulation chamber 1252b may be supplied to the sub-reservoir 1100b through the simulator discharge passage 1251. Furthermore, the second master chamber 1230a is sealed as the second cut valve 1621 is closed, so that no displacement occurs in the second master piston 1230.

FIG. 3 is a hydraulic circuit diagram illustrating an operation in a switching state of the electronic brake system 1000 according to the first embodiment of the disclosure.

Referring to FIG. 3, the electronic brake system 1000 according to the first embodiment of the disclosure has a redundancy function by including the plurality of ECUs 300 as described above.

Specifically, the electronic brake system 1000 normally operates in the first normal mode controlled by the first ECU 310, and may operate in the second normal mode controlled by the second ECU 320 when the first ECU 310 malfunctions or operates abnormally.

At this time, the electronic brake system 1000 may operate in the switching state, which is the temporary abnormal operated, before the first ECU operates abnormally and the second ECU 320 operates. Such a switching state may be about 10 ms to 100 ms, but a recognition time for which the driver feels the discomfort of kickback due to a temporary abnormal operation is within 10 ms, so a reduction in kickback is required in the switching state.

In the switching state, various devices and valves are in an abnormal state, and as the operation of the hydraulic pressure supply device 1300 that provided hydraulic pressure is stopped, the hydraulic pressure of the pressurized medium acting on each of the wheel cylinders 21, 22, 23, and 24 may be released and leaked.

Specifically, as the first cut valve 1531 of the outlet flow path 1530 is switched to an open state, the pressure applied to the third and fourth wheel cylinders 23 and 24 provided in the first hydraulic circuit 1510 may be transferred to the sub-reservoir 1100b through the outlet flow path 1530.

Furthermore, as the second cut valve 1621 of the second connection line 1620 is switched to an open state, the pressurized medium acting on the first and second wheel cylinders 21 and 22 of the second hydraulic circuit 1520 may leak into the second master chamber 1230a through the second connection line 1620. Accordingly, the hydraulic pressure may be applied to the second master piston 1230 in a retracting direction to cause a minute kickback.

On the other hand, the pedal simulator 1250 is connected to the first master chamber 1220a through the first connection line 1610 and maintains the pedal feeling in the first master piston 1220 and the brake pedal 10 connected thereto, thereby reducing a kickback significantly.

In other words, the electronic brake system 1000 according to the first embodiment of the disclosure always connects the first master chamber 1220a and the pedal simulator 1250 in normal and abnormal operation states, thereby maintaining the pedal feeling regardless of the failure of the ECU 300 and reducing a kickback occurring in the switching state.

FIG. 4 is a hydraulic circuit diagram illustrating an operation in the second normal mode of the electronic brake system 1000 according to the first embodiment of the disclosure.

Referring to FIG. 4, the electronic brake system 1000 according to the first embodiment of the disclosure may operate in the second normal mode controlled by the second ECU 320 after passing the first normal mode and the switching state as described above.

As the first ECU 310 malfunctions or operates abnormally in the second normal mode, the second ECU 320 may control various devices and valves to operate normally instead of the first ECU 310.

Operations of various devices and valves in the second normal mode are the same as those in the first normal mode, and thus descriptions will be omitted to avoid duplication.

FIG. 5 is a hydraulic circuit diagram illustrating an operation in the fallback mode of the electronic brake system 1000 according to the first embodiment of the disclosure.

Referring to FIG. 5, in the electronic brake system 1000 according to the first embodiment of the disclosure, in the fallback mode, various devices and valves are controlled to an initial braking state which is a non-operating state. Such a fallback mode may be operated when all of the plurality of ECUs 300 operate abnormally.

In the fallback mode, when the driver applies a pedal force to the brake pedal 10, the first master piston 1220 connected to the brake pedal 10 moves forward and displacement occurs. At this time, the pressurized medium accommodated in the first master chamber 1220*a* by the advance of the first master piston 1220 may be transferred to the pedal simulator 1250 through the first connection line 1610, thereby forming the pedal feeling. Furthermore, the pressurized medium filled in the simulation chamber 1252*b* may be transferred to the sub-reservoir 1100*b* through the simulator discharge passage 1251 and the first sub-reservoir flow path 1710.

At the same time, the displacement of the first master piston 1220 or the hydraulic pressure of the first master chamber 1220*a* advances the second master piston 1230 to generate displacement, and the pressurized medium accommodated in the second master chamber 1230*a* is transferred to the second hydraulic circuit 1520 and the first and second wheel cylinders 21 and 22 through the second connection line 1620, thereby implementing braking.

Therefore, in the electronic brake system 1000 according to the first embodiment of the disclosure, even when the plurality of ECUs 300 malfunctions or operates abnormally, the hydraulic pressure transferred from the master cylinder 1200 may be transferred to the wheel cylinders 21 and 22, resulting in improving braking stability.

FIG. 6 is a hydraulic circuit diagram illustrating an electronic brake system 1000 according to a modified example of the first embodiment of the disclosure.

Referring to FIG. 6, the electronic brake system 1000 of the modified example of the first embodiment of the disclosure may further include a balance passage 1411 that hydraulically connects the first hydraulic circuit 1510 and the second hydraulic circuit 1520 to each other, and a balance valve 1439.

The balance valve 1439 may be provided as a normal open type solenoid valve that is normally open and operates to be closed the valve when an electrical signal is received from the ECU 300.

According to the modified example of the first embodiment of the disclosure, in the fallback mode described above, some of the hydraulic pressure provided to the second hydraulic circuit 1520 through the second connection line 1620 is transferred to the first hydraulic circuit 1510, so that the four wheel cylinders 21, 22, 23, and 24 may be uniformly provided with the hydraulic pressure.

Hereinafter, an electronic brake system 2000 according to a second embodiment of the disclosure will be described.

FIG. 7 is a hydraulic circuit diagram illustrating an electronic brake system 2000 according to a second embodiment of the disclosure.

Referring to FIG. 7, the electronic brake system 2000 according to the second embodiment of the disclosure includes the first block 100 including a master cylinder 2200, the second block 200 including a pedal simulator 2250, the hydraulic pressure supply device 1300, and the hydraulic control unit 1400 and spaced apart from the first block 100, the plurality of electronic control units (ECUs) 300, and the connection lines 1600 having one end connected to the first block 100 and the other end connected to the second block 200.

The description of the electronic brake system 2000 according to the second embodiment of the disclosure to be described below is the same as the description of the electronic brake system 1000 according to the first embodiment of the disclosure described above except for cases where separate reference numerals are used to further describe the disclosure, and thus the description will be omitted to prevent duplication of content.

The first block 100 includes a mechanical unit connected and interworked with the brake pedal 10 to provide a mechanical operation, and the second block 200 includes an electrical unit electronically operated and controlled such as a valve and a sensor whose operation is controlled by the ECU. The first block 100 and the second block 200 are disposed to be spaced apart from each other in the vehicle and may be hydraulically connected by the plurality of connection lines 2600, thereby improving the vehicle installation of the electronic brake system 2000, and further, by promoting a degree of design freedom of the vehicle, efficient space arrangement may be possible.

The mechanical unit includes components and/or elements that perform a mechanical operation in conjunction with the brake pedal 10 irrespective of a control signal of the ECU, and may be disposed in the first block 100.

The first block 100 may include a main reservoir 2100*a* in which a pressurized medium such as a brake oil is stored, a master cylinder 2200 for pressurizing and discharging the pressurized media such as the brake oil accommodated inside in response to a pedal effort of the brake pedal 10, and a main reservoir flow path 2110 connecting the main reservoir 2100*a* and the master cylinder 2200.

The master cylinder 2200 is configured to include a hydraulic chamber, and may pressurize and discharge the pressurized medium inside. The master cylinder 2200 may include a master chamber 2220*a* and a master piston 2220 provided in the master chamber 2220*a*. The master chamber 2220*a* may be formed on an inlet side of the cylinder block 2210 to which the brake pedal 10 is connected, and the master piston 2220 may be reciprocally accommodated in the master chamber 2220*a*.

In the master chamber 2220*a*, the pressurized medium may be introduced and discharged through a first hydraulic port 2280*a* and a second hydraulic port 2280*b*. The first hydraulic port 2280*a* is connected to a main reservoir flow path 2110 to be described later so that the pressurized medium flows from the main reservoir 2100*a* to the master chamber 2220*a*. A pair of sealing members may be provided on front and rear sides of the first hydraulic port 2280*a* to seal the master chamber 2220*a*. The second hydraulic port 2280*b* is connected to a first connection line 2610 to be described later so that the pressurized medium of the master chamber 2220*a* is discharged to the first connection line 2610 or conversely, the pressurized medium may be introduced into the master chamber 2220a from the first connection line 2610.

The master piston 2220 is provided to be accommodated in the master chamber 2220a, pressurizing the pressurized medium accommodated in the master chamber 2220a by moving forward, or creating a negative pressure inside the master chamber 2220a by moving backward. Specifically, when the master piston 2220 moves forward, as the volume of the master chamber 2220a decreases, the pressurized medium present in the master chamber 2220a may be pressurized to form hydraulic pressure. Conversely, when the master piston 2220 moves backward, as the volume of the master chamber 2220a increases, the pressurized medium present in the master chamber 2220a may be decompressed, and at the same time, a negative pressure may be formed in the master chamber 2220a.

A piston spring 2220b is provided to elastically support the master piston 2220. To this end, the piston spring 2220b may be disposed between a front surface of the master piston 2220 and an inner surface of the cylinder block 2210. When a displacement occurs in the master piston 2220 according to an operation such as braking, etc., the piston spring 2220b is compressed, and then, when the operation such as the braking, etc. is released, the piston spring 2220b expands by an elastic force and the master piston 2220 may return to its original position.

The main reservoir 2100a may accommodate and store the pressurized medium therein. The main reservoir 2100a may be connected to master cylinder 2200 and a component such as a second connection line 2630 to be described later to supply or receive the pressurized medium.

The main reservoir 2100a may be provided by being partitioned into a plurality of chambers by a partition 2105a. The main reservoir 2100a includes a plurality of main reservoir chambers 2101a and 2102a, and the plurality of main reservoir chambers 2101a and 2102a may be arranged in parallel with the partition 2105a as a center. Specifically, the main reservoir 2100a may be divided into a first main reservoir chamber 2101a disposed on one side and a second main reservoir chamber 2102a disposed on the other side.

The partition 2105a may be provided between the adjacent main reservoir chambers 2101a and 2102a, and the partition 2105a may be provided with at least a part of an upper end thereof open. Accordingly, the adjacent main reservoir chambers 2101a and 2102a communicate with each other so that the pressurized medium may move. For example, when a large amount of the pressurized medium flows into the first main reservoir chamber 2101a, the pressurized medium may be delivered to the second main reservoir chamber 2102a through the upper end of the partition 2105a.

The first main reservoir chamber 2101a may be connected to the main reservoir flow path 2110 to supply or receive the pressurized medium toward the master cylinder 2200. Furthermore, the second main reservoir chamber 2102a may be connected to a second connection line 2630 to be described later to supply the pressurized medium to a sub-reservoir 2100b or to receive the pressurized medium from the sub-reservoir 2100b.

As such, since the main reservoir 2100a is divided into the first and second main reservoir chambers 2101a and 2102a, the electronic brake system 2000 may be operated stably. For example, when the main reservoir 2100a is formed as a single chamber and a capacity of the pressurized medium is insufficient, the pressurized medium may not be stably supplied not only to the sub-reservoir 2100b but also the master cylinder 2200 side. Accordingly, by separating the main reservoir 2100a, in which the second main reservoir chamber 2102a is connected to the sub-reservoir 1100b of the second block 200 and the first main reservoir chamber 2101a is connected to the master cylinder 2200 side, even when the pressurized medium may not be supplied to any one component, the vehicle may be braked by supplying the pressurized medium to other components.

The main reservoir flow path 2110 is provided to hydraulically connect the master cylinder 2200 and the main reservoir 2100a. The main reservoir flow path 2110 connects the master chamber 2220a and the first main reservoir chamber 2101a of the main reservoir 2100a. To this end, one end of the main reservoir flow path 2110 may communicate with the master chamber 2220a of the master cylinder 2200, and the other end thereof may communicate with the first main reservoir chamber 2101a of the main reservoir 2100a.

A pedal folding device 1260 may move the brake pedal 10 so as to improve a driver's comfortable habitability and operability of the vehicle according to an operating situation of the vehicle. For example, when the vehicle autonomously drives, braking of the vehicle is automatically implemented, so that the driver's operation of the brake pedal 10 is unnecessary. Therefore, the electronic brake system 2000 according to an embodiment of the disclosure advances the brake pedal 10 by the pedal folding device 2260 to accommodate the brake pedal 10 from a passenger space of the vehicle, thereby providing the comfortable habitability to the driver. On the contrary, when the vehicle is traveled and braked by the driver, the brake pedal 10 may exposed to the passenger space of the vehicle on which the driver is riding by reversing the brake pedal 10 so that the driver may easily operate the brake pedal 10. In addition, because the position at which the brake pedal 10 is easily manipulated may vary according to a body size of the driver and the driver may require the comfortable habitability even when the vehicle is stopped, the pedal folding device 2260 may adjust the brake pedal 10 to a suitable position.

The pedal folding device 2260 is disposed on the first block 100, and may be provided between the master piston 2220 and an input rod of the brake pedal 10. The pedal folding device 2260 may include an actuator 2261 that generates and provides power for movement of the brake pedal 10 or the input rod, and a gear unit 2262 that converts a rotational motion of the actuator 2261 into a linear motion of the input rod. The actuator 2261 may include a driving motor that receives an electrical power from a vehicle battery (not shown) to generate a power, and the gear unit 2262 receives a rotational force of the driving motor to generate forward and backward movement of the input rod and brake pedal 10. Gear unit 2262 may be provided in various gear structures for converting the rotational motion into the linear motion, for example, a first thread formed on an outer circumferential surface of the input rod, and a second thread formed on a drive shaft of the drive motor and meshed with the first thread, but it is not limited thereto.

The electrical unit may include a component that is electronically operated and controlled by control signals of the plurality of ECUs, and may be disposed in the second block 200.

The second block 200 may include the sub-reservoir 2100b for auxiliary storing the pressurized medium therein, a pedal simulator 2250 that provides a reaction force to the driver's pedal effort for the brake pedal 10, a hydraulic pressure supply device 1300 that receives the driver's braking intention as an electrical signal by the pedal displacement sensor 11 that detects a displacement of the brake pedal 10 and generates a hydraulic pressure of the pressurized medium through the mechanical operation, a hydraulic control unit 1400 that controls a hydraulic pressure supplied from the hydraulic pressure supply device 1300 and a hydraulic pressure transferred to the first to fourth wheel cylinders 21, 22, 23, and 24, a dump control unit 2800 that hydraulically connects the sub-reservoir 2100b and the hydraulic pressure supply device 2300 and controls the flow of the pressurized medium therebetween, a plurality of sub-reservoir flow paths 2710, 2720, 1730, and 1740 connecting the sub-reservoir 2100b to the first and second hydraulic circuits 1510 and 1520 and the dump control unit 1800 side, a plurality of cut valves 411 and 412a provided in the connection lines to control the flow of the pressurized medium, and the circuit pressure sensor PS1 for detecting the hydraulic pressure of the pressurized medium supplied by the hydraulic pressure supply device 2300.

The ECU 300 may receive electrical signals detected by various sensors, transmit electrical signals to components such as various devices and valves, and determine whether there is an abnormality.

The ECU 300 may be provided in plurality and have a redundancy function. Specifically, the ECU 300 may include the first ECU 310 and the second ECU 320. The first ECU 310 normally controls various devices and valves and the second ECU 320 may operate to control various devices and valves on behalf of the first ECU 310 when the first ECU 310 operates abnormally. In other words, when the first ECU 310 operates abnormally, a sensor recognizes whether there is an abnormality, and the ECU 300 blocks signals of the first ECU 310 and allows the second ECU 320 to control various devices and valves.

The pedal simulator 2250 provides the reaction force to the driver's pedal effort for the brake pedal 10.

The pedal simulator 2250 has a front end connected to the first connection line 2610 to be described later, and a rear end connected to the sub-reservoir 1100b through a simulator discharge passage 2251.

The pedal simulator 2250 may include a simulation piston 2252a provided to be displaceable by the pressurized medium introduced through the first connection line 2610, a simulation chamber 2252b whose volume is changed by displacement of the simulation piston 2252a and communicating with a rear end of the simulator discharge passage 2251, and a simulation spring 2252c elastically supporting the simulation piston 2252a.

The simulation piston 2252a is provided to be displaceable in the simulation chamber 2252b by the pressurized medium introduced through the first connection line 2610. Specifically, the hydraulic pressure of the pressurized medium flowing in through the first connection line 2610 is delivered to a front surface of the simulation piston 2252a to cause displacement in the simulation piston 2252a. And, as the volume of the simulation chamber 2252b formed on a rear surface of the simulation piston 2252a decreases by the displacement of the simulation piston 1252a, the simulation spring 2252c is compressed according to the displacement of the simulation piston 2252a by elastically supporting the simulation piston 2252a, so that an elastic restoring force therefor may be provided to the driver as the pedal feeling.

On the other hand, in the drawings, as an example, the simulation spring 2252c is illustrated as a coil spring, but in addition to providing an elastic force to the simulation piston 2252a and providing an elastic restoring force, various structures may be possible. For example, the simulation spring may be made of a material such as a rubber, or may be formed of various members capable of storing an elastic force such as a leaf spring.

The simulator discharge passage 2251 may be connected to a rear end of the pedal simulator 2250 so that one end thereof communicates with the simulation chamber 2252b and the other end thereof joins the first sub-reservoir flow path 2710 to be described later. Through this, by connecting the simulation chamber 2252b and the sub-reservoir 1100b, the pressurized medium discharged from the simulation chamber 2252b may be supplied to the sub-reservoir 1100b, or conversely, the pressurized medium may be supplied from the sub-reservoir 1100b to the simulation chamber 2252b.

An operation of the pedal simulator 2250 will be described. When the driver depresses the brake pedal 10 to apply the pedaling effort, the master piston 2220 advances and the pressurized medium in the master chamber 2220a is supplied and pressurized to the front surface of the simulation piston 2252a through the first connection line 2610. Accordingly, as displacement occurs in the simulation piston 2252a, the simulation spring 2252c is compressed, and the elastic restoring force of the simulation spring 2252c may be provided to the driver as the pedal feeling. At this time, the pressurized medium filled in the simulation chamber 2252b is transferred to the sub-reservoir 1100b through the simulator discharge passage 2251 and the first sub-reservoir flow path 2710. Thereafter, when the driver releases the pedaling effort for the brake pedal 10, the simulation spring 2252c expands by the elastic restoring force and the simulation piston 2252a returns to its original position, and the pressurized medium that pressurizes the front surface of the simulation piston 2252a returns to the master chamber 2220a through the first connection line 2610. The pressurized medium is supplied to the simulation chamber 2252b sequentially passing though the sub-reservoir 1100b, the first sub-reservoir flow path 2710, and the simulator discharge passage 2251, so that the inside of the simulation chamber 2252b may be filled with the pressurized medium again.

As such, because the inside of the simulation chamber 2252b is always filled with the pressurized medium, a friction of the simulation piston 2252a is minimized when the pedal simulator 2250 is operated, so that a durability of the pedal simulator 2250 is improved, as well as an inflow of foreign substances from an external may be blocked.

The sub-reservoir flow paths are provided to hydraulically connect the first hydraulic circuit 1510, the second hydraulic circuit 1520, and the hydraulic pressure supply device 1300 to the sub-reservoir 1100b. The sub-reservoir flow path may include the first sub-reservoir flow path 2710 connecting the sub-reservoir 1100b and the rear end of the first hydraulic circuit 1510, the second sub-reservoir flow path 2720 connecting the sub-reservoir 2100b and the rear end of the second hydraulic circuit 1520, the third sub-reservoir flow path 1730 connecting the sub-reservoir 2100b and the first dump control unit, and the fourth sub-reservoir 1740 connecting the sub-reservoir 2100b and the second dump control unit.

The second sub-reservoir flow path 2720 has one end connected to the second sub-reservoir chamber 2102b of the sub-reservoir 1100b and the other end connected to a downstream side of the first and second outlet valves 2522a and 2522b of the second hydraulic circuit 2520. Furthermore, the first sub-reservoir flow path 2710 has one end connected to the second sub-reservoir chamber 2102b of the sub-reservoir 1100b and the other end connected to a downstream side of the third and fourth outlet valves 2512a and 2512b of the first hydraulic circuit 2510, and the simulator discharge passage 2251 may join at the middle portion thereof. Furthermore, the third sub-reservoir flow path 2730 has one end connected to the third sub-reservoir chamber 2103b of the sub-reservoir 2100b and the other end connected to the first dump control unit side, and the fourth sub-reservoir flow path 2740 has one end connected to the first sub-reservoir chamber 2101b of the sub-reservoir 2100b and the other end connected to the second dump control unit side.

The second block 200 may include a first circuit pressure sensor PS11 for detecting the hydraulic pressure of the pressurized medium transferred from the hydraulic pressure supply device 1300 to the second hydraulic circuit 1520, and a second circuit pressure sensor PS12 for detecting the hydraulic pressure of the pressurized medium transferred from the hydraulic pressure supply device 1300 to the first hydraulic circuit 1510. A first outlet flow path 2530 may be provided to connect the first hydraulic circuit 1510 and the first sub-reservoir flow path 2710 to control the discharge of the pressurized medium from the third and fourth wheel cylinders 23 and 24. A first cut valve 2531 for controlling the discharge of the pressurized medium may be provided in the first outlet flow path 2530. The first cut valve 2531 may be provided as a normally open type solenoid valve that is normally open and operates to be closed the valve when an electrical signal is received from the ECU 300.

A second outlet flow path 2540 may be provided to connect the second hydraulic circuit 1520 and the sub-reservoir 1100b to control the discharge of the pressurized medium from the first and first wheel cylinders 21 and 22. A second cut valve 2541 for controlling the discharge of the pressurized medium may be provided in the second outlet flow path 2540. The second cut valve 2541 may be provided as a normally open type solenoid valve that is normally open and operates to be closed the valve when an electrical signal is received from the ECU 300.

The connection lines 2600 are provided to hydraulically connect the first block 100 and the second block 200 spaced apart from each other.

The connection line 2600 may include the first connection line 2610 connecting the master cylinder 2200 of the first block 100 to the pedal simulator 2250 side, and the second connection line 2630 connecting the main reservoir 2100a of the first block 100 and the sub-reservoir 1100b of the second block 200 to each other.

The first connection line 2610 may have one end connected to the master chamber 2220a of the master cylinder 2200 and the other end connected to the front end of the pedal simulator 2250.

The second connection line 2630 may have one end communicating with the main reservoir 2100a and the other end communicating with the sub-reservoir 1100b. The second connection line 2630 allows transferring of the pressurized medium between the reservoirs when the pressurized medium is excessively large or small in one side of the reservoirs, thereby promoting smooth supply of the pressurized medium to each component.

The first connection line 2610 may be provided as a pipe having a predetermined strength, and the second connection line 2630 may be provided as a hose having an elasticity. Since the second connection line 2630 transfers the pressurized medium in which the hydraulic pressure is formed from the master chamber 2220a, a pipe having strength to withstand the hydraulic pressure is provided, thereby promoting durability and performance of the product. On the other hand, the second connection line 2630 is provided in connection with the main reservoir 2100a or the sub-reservoir 2100b, which have an internal pressure of the atmospheric pressure level, and thus the pressurized medium in which the hydraulic pressure is not formed is transferred. Therefore, the second connection line 2630 may be provided with the hose having the elasticity to promote ease of installation according to the arrangement position of the first block 100 and the second block 200. The first connection line 2610 and the second connection line 2630 may be installed on a vehicle body by a fastening member (not shown) having a predetermined restoring force so as to maintain connectivity even in the event of an impact such as a vehicle accident.

Hereinafter, an operation of the electronic brake system 2000 according to the second embodiment of the disclosure will be described.

The electronic brake system 2000 according to the second embodiment of the disclosure includes the plurality of ECUs 310 and 320, and then may be controlled and operated by the first ECU 310 and the second ECU 320 during normal operation. Specifically, the electronic brake system 2000 may operate a first normal mode controlled by the first ECU 310, and a second normal mode controlled by the second ECU 320 when the first ECU 310 operates abnormally.

At this time, the electronic brake system 2000 according to the second embodiment of the disclosure, when switching from the first normal mode to the second normal mode, may operate in a switching state, which is a temporary abnormal state. Herein, the switching from the first normal mode to the second normal mode may refers to in a state before the first ECU 310 operates abnormally and recognizes it, and the second ECU 320 operates.

In other words, the electronic brake system 2000 according to the second embodiment of the disclosure may sequentially implement the following operations. That is, the electronic brake system 2000 operates in the first normal mode to be controlled by the first ECU 310 during the normal operation, operates in the switching state until the second ECU 320 operates when the first ECU 310 operate abnormally, and operates in the second normal mode to be controlled by the second ECU 320.

FIG. 8 is a hydraulic circuit diagram illustrating an operation in the first normal mode of the electronic brake system 2000 according to the second embodiment of the disclosure.

Referring to FIG. 8, in the first normal mode of the electronic brake system 2000 according to the second embodiment of the disclosure, various devices and valves operate normally, and the various devices and valves may be controlled by the first ECU 310.

In the first normal mode, when the driver depresses on the brake pedal 10, the pedal sensor 11 detects the pedal effort and transmits an electrical signal to the first ECU 310. Accordingly, the first ECU 310 transmits electrical signals to various devices and valves to generate hydraulic pressure in the hydraulic pressure supply device 1300 and then to provide the hydraulic pressure of the pressurized medium to the wheel cylinders 21, 22, 23, and 24 through the hydraulic control unit 1400 and the first and second hydraulic circuits 1510 and 1520.

In the first normal mode, each of the first and second cut valves 2531 and 2541 provided in the first and second outlet flow paths 1530 and 1540 is switched to be closed so that the hydraulic pressure acting on the first and second hydraulic circuits 1510 and 1520 do not leak, thereby implementing braking to the wheel cylinders 21, 22, 23, and 24 by the hydraulic pressure supply device 1300.

When the pedal effort is applied to the brake pedal 10, the master piston 2220 advances, and the pressurized medium accommodated in the master chamber 2220a is transferred to the pedal simulator 2250 through the first connection line 2610. Accordingly, the simulation spring 2252c is elastically deformed by the displacement of the simulation piston 2252a, and the elastic restoring force of the simulation spring 2252c is provided to the driver as the pedal feeling. At this time, the pressurized medium accommodated in the simulation chamber 2252b may be supplied to the sub-reservoir 1100b through the simulator discharge passage 2251.

FIG. 9 is a hydraulic circuit diagram illustrating an operation in a switching state of the electronic brake system 2000 according to the second embodiment of the disclosure.

Referring to FIG. 9, the electronic brake system 2000 according to the second embodiment of the disclosure has a redundancy function by including the plurality of ECUs 300 as described above.

Specifically, the electronic brake system 2000 normally operates in the first normal mode controlled by the first ECU 310, and may operate in the second normal mode controlled by the second ECU 320 when the first ECU 310 malfunctions or operates abnormally.

At this time, the electronic brake system 2000 may operate in the switching state, which is the temporary abnormal operated, before the first ECU operates abnormally and the second ECU 320 operates. Such a switching state may be about 10 ms to 100 ms, but the recognition time for which the driver feels the discomfort of kickback due to the temporary abnormal operation is within 10 ms, so a reduction in kickback is required in the switching state.

In the switching state, various devices and valves are in an abnormal state, and as the operation of the hydraulic pressure supply device 1300 that provided hydraulic pressure is stopped, the hydraulic pressure of the pressurized medium acting on each of the wheel cylinders 21, 22, 23, and 24 may be released and leaked.

Specifically, as the first cut valve 2531 of the first outlet flow path 2530 is switched to an open state, the pressure applied to the third and fourth wheel cylinders 23 and 24 provided in the first hydraulic circuit 1510 may be transferred to the sub-reservoir 1100b through the first outlet flow path 2530.

Furthermore, as the second cut valve 2541 of the second outlet flow path 2540 is switched to an open state, the pressurized medium acting on the first and second wheel cylinders 21 and 22 of the second hydraulic circuit 1520 may leak into the sub-reservoir 1100b through the second outlet flow path 2540. Accordingly, since the pressurized medium leaking from the plurality of wheel cylinders 21, 22, 23, and 24 is not transferred to the master cylinder 2200, thereby no occurring a kickback.

On the other hand, the pedal simulator 2250 is connected to the master chamber 2220a through the first connection line 2610 and maintains the pedal feeling in the master piston 2220 and the brake pedal 10 connected thereto, thereby reducing a kickback significantly.

In other words, the electronic brake system 2000 according to the second embodiment of the disclosure always connects the master chamber 2220a and the pedal simulator 2250 in normal and abnormal operation states, thereby maintaining the pedal feeling regardless of the failure of the ECU 300 and reducing a kickback occurring in the switching state.

FIG. 10 is a hydraulic circuit diagram illustrating an operation in the second normal mode of the electronic brake system 2000 according to the second embodiment of the disclosure.

Referring to FIG. 10, the electronic brake system 2000 according to the second embodiment of the disclosure may operate in the second normal mode controlled by the second ECU 320 after passing the first normal mode and the switching state as described above.

As the first ECU 310 malfunctions or operates abnormally in the second normal mode, the second ECU 320 may control various devices and valves to operate normally instead of the first ECU 310.

Operations of various devices and valves in the second normal mode are the same as those in the first normal mode, and thus descriptions will be omitted to avoid duplication.

As described above, the electronic brake systems 1000 and 2000 of the first and second embodiments of the disclosure include the plurality of ECUs 300, so that even when any one ECU malfunctions or operates abnormally, other ECUs operates instead, thereby improving safety.

In addition, the electronic brake systems 1000 and 2000 according to the first and second embodiments of the disclosure may maintain pedal feeling and reduce kickback even when any one ECU malfunctions or operates abnormally to switch to other ECUs, thereby reducing the driver's discomfort.

As is apparent from the above, the embodiments of the disclosure can effectively implement braking in various operating situations.

Further, the embodiments of the disclosure can improve performance and operational reliability.

Further, the embodiments of the disclosure can improve the degree of design freedom of the vehicle.

Further, the embodiments of the disclosure can easily and efficiently install and dispose the vehicle.

Further, the embodiments of the disclosure can stably provide a braking pressure even when a component fails.

Further, the embodiments of the disclosure can improve a safety through the redundancy function of the plurality of ECUs.

Further, the embodiments of the disclosure can reduce a kickback and maintain a pedal feel to reduce a sense of heterogeneity in a driver's pedal feeling.

Although exemplary embodiments of the disclosure have been described for illustrative purposes, those skilled in the art will appreciate that various modifications, additions and substitutions are possible, without departing from the scope and spirit of the disclosure. Therefore, exemplary embodiments of the disclosure have not been described for limiting purposes.

What is claimed is:

1. An electronic brake system, comprising:
   a first block comprising a master cylinder including a first master piston connected to a brake pedal and a first master chamber whose volume is changed by a displacement of the first master piston;
   a second block comprising a pedal simulator, a hydraulic pressure supply device that generates a hydraulic pressure by operating a hydraulic piston according to an electrical signal, a hydraulic control unit comprising a first hydraulic circuit that controls a hydraulic pressure transferred to two wheel cylinders and a second hydraulic circuit that controls a hydraulic pressure transferred to other two wheel cylinders, the second block disposed to be spaced apart from the first block;
   a plurality of electronic control units (ECUs) configured to control valves based on hydraulic pressure information and displacement information of the brake pedal; and a first connection line having one end connected to the first block and the other end connected to the second block;
wherein the first connection line has one end connected to the first master chamber and another end connected to the pedal simulator without being connected with the first and second hydraulic circuits, such that when the first master piston advances, a medium accommodated in the first master chamber is transferred only to the pedal simulator through the first connection line.

2. The electronic brake system of claim 1, wherein
the master cylinder further comprises a second master piston provided to be displaceable by a hydraulic pressure of the first master chamber, and a second master chamber whose volume is changed by a displacement of the second master piston, and
the electronic brake system further comprises a second connection line having one end connected to the second master chamber and another end connected to the second hydraulic circuit.

3. The electronic brake system of claim 2, wherein
the first block further comprises a main reservoir in which the medium is stored, and
the second block further comprises a sub-reservoir in which the medium is stored, and the electronic brake system further comprises a third connection line having one end connected to the main reservoir and the other end thereof connected to the sub-reservoir.

4. The electronic brake system of claim 3, wherein
the second block further comprises:
  an outlet flow path connecting the first hydraulic circuit and the sub-reservoir;
  a first cut valve provided in the outlet flow path to control a flow of the medium; and
  a second cut valve provided on the second connection line to control a flow of the medium.

5. The electronic brake system of claim 4, wherein
the second block further comprises:
  a first sub-reservoir flow path connecting the sub-reservoir and a rear end of the first hydraulic circuit; and
  a second sub-reservoir flow path connecting the sub-reservoir and a rear end of the second hydraulic circuit.

6. The electronic brake system of claim 5, wherein
the second block further comprises a simulator discharge passage connected to a rear end of the pedal simulator, and
the simulator discharge passage joins the first sub-reservoir flow path and is connected to the sub-reservoir.

7. The electronic brake system of claim 2, wherein
the hydraulic control unit further comprises a balance passage connecting the first hydraulic circuit and the second hydraulic circuit, and a balance valve provided in the balance passage to control a flow of the medium.

8. The electronic brake system of claim 1, wherein
the first block further comprises a pedal folding device provided between the first master piston and the brake pedal.

9. The electronic brake system of claim 8, wherein
the first block further comprises a main reservoir in which the medium is stored, and
the second block further comprises a sub-reservoir in which the medium is stored, and the electronic brake system further comprises a second connection line having one end connected to the main reservoir and the other end thereof connected to the sub-reservoir.

10. The electronic brake system of claim 9, wherein
the second block further comprises:
  a first sub-reservoir flow path connecting the sub-reservoir and a rear end of the first hydraulic circuit; and
  a second sub-reservoir flow path connecting the sub-reservoir and a rear end of the second hydraulic circuit.

11. The electronic brake system of claim 10, wherein
the second block further comprises:
  a first outlet flow path connecting the first hydraulic circuit and the first sub-reservoir flow path;
  a second outlet flow path connecting the second hydraulic circuit and the sub-reservoir;
  a first cut valve provided in the first outlet flow path to control a flow of the medium; and
  a second cut valve provided in the second outlet flow path to control a flow of the medium.

12. The electronic brake system of claim 10, wherein
the second block further comprises a simulator discharge passage connected to a rear end of the pedal simulator, and
the simulator discharge passage joins the first sub-reservoir flow path and is connected to the sub-reservoir.

13. The electronic brake system of claim 8, wherein
the pedal folding device comprises:
  an actuator that generates and provides a power; and
  a gear unit provided between the actuator and an input rod connected to the brake pedal and is configured to convert a rotational force of the actuator into a linear motion of the input rod.

14. The electronic brake system of claim 5, wherein
the hydraulic pressure supply device comprises a first pressure chamber provided in front of the hydraulic piston and a second pressure chamber provided in a rear of the hydraulic piston.

15. The electronic brake system of claim 14, wherein
the second block further comprises a dump control unit provided between the sub-reservoir and the hydraulic pressure supply device to control a flow of the medium, and
the dump control unit comprises a first dump control unit that controls a flow of the medium between the first pressure chamber and the sub-reservoir, and a second dump control unit that controls a flow of the medium between the second pressure chamber and the sub-reservoir.

16. The electronic brake system of claim 15, wherein
the second block further comprises a third sub-reservoir flow path connecting the sub-reservoir and the first dump control unit, and a fourth sub-reservoir flow path connecting the sub-reservoir and the second dump control unit.

17. The electronic brake system of claim 1, wherein
the plurality of ECUs comprises a first ECU that controls various devices and valves, and a second ECU that operates when the first ECU operates abnormally.

* * * * *